United States Patent [19]
Masuda et al.

[11] Patent Number: 5,817,843
[45] Date of Patent: *Oct. 6, 1998

[54] QUINIZARIN COMPOUND, METHOD FOR PRODUCTION THEREOF, AND USE THEREFOR

[75] Inventors: Kiyoshi Masuda; Yukie Tamaura; Osamu Kaieda, all of Ibaraki, Japan

[73] Assignee: Nippon Shokubai Co., Ltd., Japan

[ * ] Notice: The term of this patent shall not extend beyond the expiration date of Pat. No. 5,608,091.

[21] Appl. No.: 730,989

[22] Filed: Oct. 16, 1996

Related U.S. Application Data

[62] Division of Ser. No. 316,244, Sep. 30, 1994, Pat. No. 5,608,091.

[30] Foreign Application Priority Data

Jan. 29, 1993 [JP] Japan ..................................... 5-13726
Feb. 1, 1993 [JP] Japan ..................................... 5-14834
Jul. 21, 1993 [JP] Japan ..................................... 5-180316

[51] Int. Cl.⁶ ...................... C07D 307/94; C09D 11/00; G03G 17/00
[52] U.S. Cl. .......................... 552/250; 552/236; 552/237; 552/244; 552/249; 106/31.27; 347/100; 428/64.4; 430/32
[58] Field of Search ..................................... 552/250, 236, 552/244, 249, 237; 428/64.4; 430/32; 347/100; 106/31.27

[56] References Cited

U.S. PATENT DOCUMENTS 3,992,421 11/1976 Botros .
5,608,091 3/1997 Masuda et al. .......................... 552/250

Primary Examiner—Shean C. Wu
Attorney, Agent, or Firm—Omri M. Behr, Esq.

[57] ABSTRACT

This invention is to provide a novel quinizarin compound which has a quinizarin structure represented by a following formula (1) having one to four of the 5, 6, 7, and 8 positions and at least either the 6 or 7 position formed of at least one member selected from the class consisting of secondary amino groups, alkylthio groups, and optionally substituted phenylthio groups, and having the remaining positions thereof formed of at least one member selected from the class consisting of hydrogen atom, halogen atoms, amino group, hydroxy group, alkoxy groups, and optionally substituted phenoxy groups, a method for the production thereof, and a dye, an electrophotographic grade color toner composition, a thermal-transfer recording sheet, an optical recording medium, an ink jet grade ink composition and a color filter severally comprising the quinizarin compound.

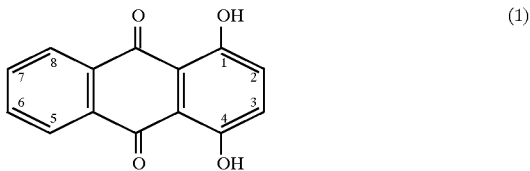

12 Claims, 1 Drawing Sheet

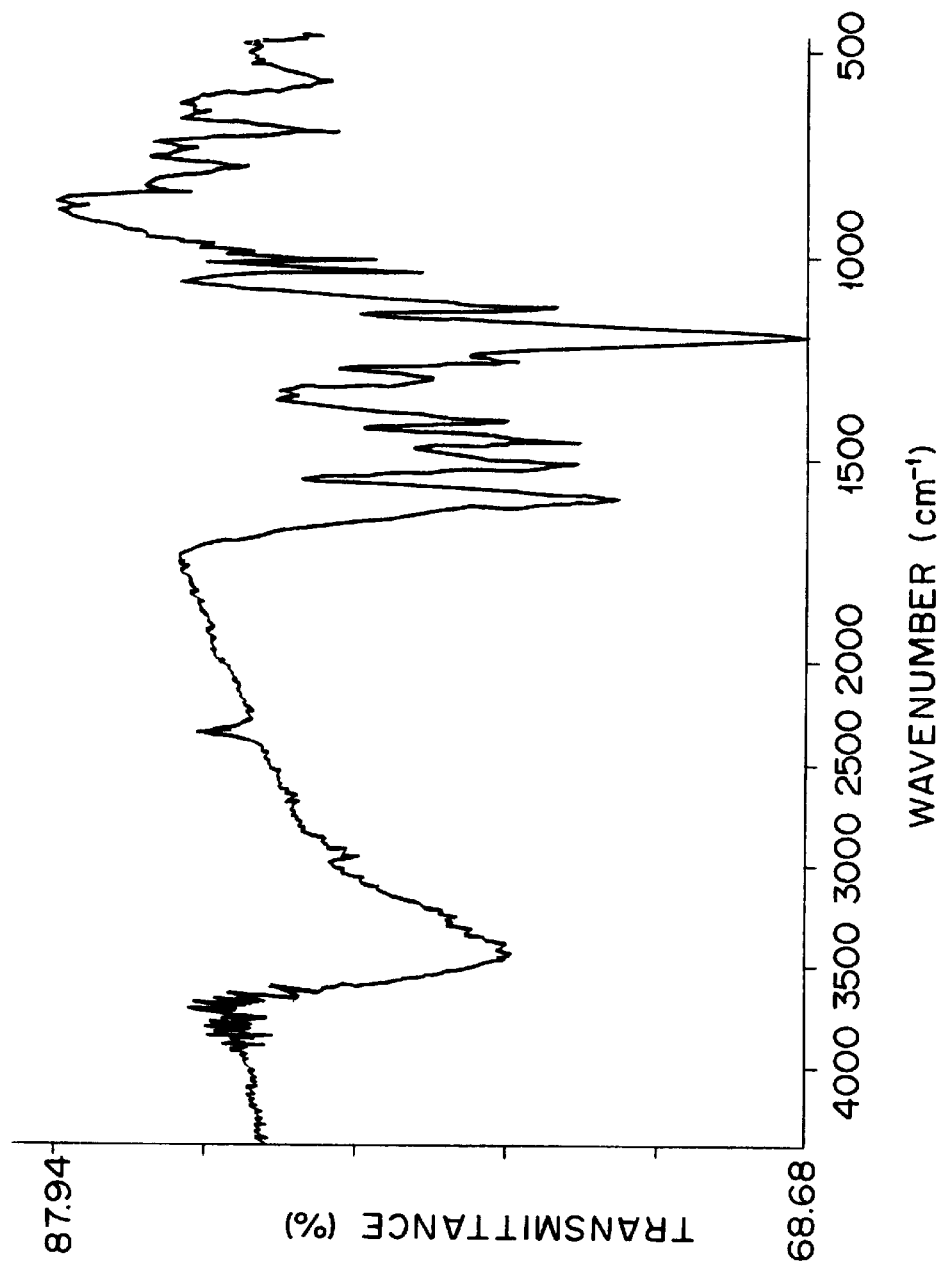
FIGURE

QUINIZARIN COMPOUND, METHOD FOR PRODUCTION THEREOF, AND USE THEREFOR

This application is a division of application Ser. No. 08/316,244, filed Sep. 30, 1994 U.S. Pat. No. 5,608,091.

BACKGROUND OF THE INVENTION

1. Field of the Invention

This invention relates to a novel quinizarin compound, a method for the production thereof, a dye formed of the compound, and an electrophotographic color toner composition, a thermal-transfer recording sheet, an optical recording medium, a color filter, and an ink jet grade ink composition severally containing the compound.

The novel quinizarin type compound of this invention exhibits absorption in an orange-red-blue-green-near infrared region of 480 nm to 850 nm in wavelength, manifests outstanding solubility, and excels in resistance to light or heat. In the field of optoelectronic data, the novel quinizarin type compound manifests an excellent effect as display materials or recording materials exhibiting absorption in the visible region or near infrared region when it is used in a thermal-transfer dye, an ink jet grade ink, a color separation filter for a camera tube, a liquid crystal display grade color filter, an optical color filter, a color toner, a bar code grade ink for preventing fake, a guest-host type liquid crystal display grade dichroic dye, a polarizer grade dichroic dye, an optical recording media suitable for compact disk, etc. The effect so manifested particularly gains in prominence when this compound is used in a magenta type or cyan type dye.

Further, as a high-quality coloring agent of excellent solubility and high fastness fit for the orange-red-blue-green region, the quinizarin type compound of this invention manifests an ideal effect when it is used in dyes for fibers, paints for automobiles, paints for building materials, coloring agents for printing plates, writing inks, coloring agents for glass flakes, and coloring agents for spectacle lenses.

2. Description of the Prior Art

In recent years, the functionalities of the organic dye manifested in the field of optoelectronic data recording have been attracting attention of the industry as the trend of the field toward impartation of colors to the data display images or their hard copies has been gaining in impetus. As respects the display materials or recording materials suitable for this trend, the necessity for developing the so-called visible light absorption dye such as, for example, a thermal-transfer dye, an ink jet grade ink, a color separation filter for a camera tube, a liquid crystal display grade color filter, an optical color filter, a color toner, a bar code grade ink for preventing fake, a guest-host type liquid crystal display grade dichroic dye, and a polarizer grade dichroic dye which exhibit an absorption in the visible region has been finding growing recognition.

Particularly, in recent years, applications which handle electronic images including computer graphics have been suddenly increasing. As a result, the desirability of having such electronic images as TV images of video movies and electronic still cameras recorded as color hard copies has been finding growing recognition.

Among other methods which are available for the purpose of this recording, the so-called thermal-transfer recording method which comprises using a thermal transfer sheet formed by coating a substrate sheet with a thermal-transfer grade dye, heating selectively the sheet with a thermosensitive head, and transferring the molten dye onto a recording paper dyable with the molten dye has been attracting attention as an important recording method capable of producing a full-color image excellent in repeatability of gradient and color.

Generally, the primary colors of yellow, magenta, and cyan are used for these thermal transfer sheets. Very few of the dyes heretofore proposed, however, satisfy all the conditions necessary for the thermal-transfer recording, namely (1) color tone, (2) solubility in or compatibility with an ink solvent and an ink binder resin, (3) resistance to heat, (4) transferability, and (5) lightfastness. Thus, the appearance of a dye satisfying the optimum conditions for the operation of the thermal-transfer recording has been longed for.

Among other compounds, the anthraquinone type compounds which are inherently stable to resist against light, heat, and temperature and excellent in fastness have been being studied from numerous angles for the purpose of adapting them to be controlled to an absorption wavelength necessary for magenta dyes and cyan dyes and to be rendered soluble in a solvent or a resin as required by intended applications.

For example, JP-A-60-122,192, JP-A-60-131,293, JP-A-60-159,091, JP-A-61-227,093, JP-A-60-253,595, JP-A-62-25,092, JP-A-62-97,886, JP-A-63-288,787, JP-A-63-288, 788, JP-A-63-288,789, JP-A-01-174,490, JP-A-04-21,490, etc. disclose magenta dyes which result from introducing various functional groups at the 2 position into the 1-amino-4-hydroxy-anthraquinone compound. Though some of them possess solubility, they are invariably deficient in absorption wavelength or lightfastness.

Further, JP-A-59-227,948, JP-A-60-31,559, JP-A-60-53, 563, JP-A-60-122,192, JP-A-60-131,292, JP-A-60-131,294, JP-A-60-151,097, JP-A-60-172,591, JP-A-61-57,391, JP-A-61-193,887, JP-A-61-255,897, JP-A-62-138,291, JP-A-01-178,495, JP-A-01-221,287, JP-A-01-255,594, JP-A-01-258, 995, JP-A-01-258,996, JP-A-02-9,685, JP-A-02-43,093, JP-A-02-132,462, JP-A-02-175,293, JP-A-04-122,695, JP-A-04-270,689, etc. disclose anthraquinone type cyan dyes which have amino group, alkylamino group, allylamino group, and various functional groups introduced therein. Though some of these dyes possess solubility, they are invariably deficient in absorption wavelength or lightfastness.

The electrophotography generally produces a visible image by a procedure which comprises forming an electric latent image of static charge on a photoelectroconductive sensitive material by charging or exposure to light, then developing this electric latent image with a toner, optionally transferring the resultant toner image onto a transfer paper, and fixing the toner image by application of heat or application of pressure. For the visible image, generally the toner which is produced by dispersing a black coloring agent such as carbon black in a binder resin is mostly used. The sudden increase of the applications which deal with electronic images including computer graphics has been even urging the electromicrography to promote the impartation of colors to the electronic images. Thus, the practice of producing color toners having various dyes and/or pigments of yellow, magenta and cyan, dissolved or dispersed in a binder resin has been prevailing.

Generally, the full-color toner has been heretofore produced by melting a binder resin and a coloring agent, kneading the molten mixture, pulverizing the resultant mixture, and classifying the produced powder and separating a powder having a prescribed grain size distribution. In this case, a pigment is generally used as a coloring agent. The color imparted by the pigment is at a disadvantage in being deficient in transparency because the pigment as a coloring agent is merely dispersed in the binder resin. Particularly when an electronic image is to be formed as on a transparent sheet for use with an overhead projector, the projected image is dim and turbid. The problem of poor transparency may be solved to a certain extent by decreasing the grain size of the pigment particles to the order of sub-microns. The pulverization of the pigment to the order of sub-microns is difficult to attain. Further the pulverized pigment is required to be uniformly dispersed finely in the binder resin. This uniform dispersion is extremely difficult to attain.

Numerous studies have been being continued in search of a dye which exhibits solubility in a binder resin. The use of such a dye as a coloring agent, however, has the problem that it goes chiefly to degrade the lightfastness of the produced toner. Thus, numerous studies are now under way regarding the usability in the toner of a dye which exhibits high compatibility with a binder resin and abounds in lightfastness. For example, the anthraquinone type cyan dyes are disclosed in JP-A-01-237,667, JP-A-01-284,865, JP-A-02-47,668, JP-A-02-110,573, JP-A-02-132,462, JP-A-03-87, 754, JP-A-05-107,812, etc. None of them, however, satisfies all the conditions of transparency, color tone, and lightfastness.

In recent years, such optical recording media as compact discs, laser discs, optical memory discs, and optical cards which use a semiconductor laser as a light source have been being developed actively. Particularly, CD, PHOTO-CD, and CD-ROM are now copiously utilized as digital recording media of high capacity and rapid access for the storage and regeneration of voices, images, and code data. These systems invariably are in need of so-called near infrared absorption dyes which are sensitive to the semiconductor laser. These dyes are desired to possess excellent characteristics.

The basic characteristics which are required of such a dye for use in an optical recording medium include, for example, (1) that the dye is controlled to an absorption wavelength which is required for an intended application, (2) that from the practical point of view, the dye is applicable to a surface by a method which converts the dye into a thin film without using such a complicated step as vacuum deposition or dispersion in a resin, namely a method resorting as to a spin coat and enjoying convenience and excelling in productivity, and is excellent in solubility in a solvent incapable of corroding a substrate, (3) that the dye possesses high reflectance, (4) that the dye excels in resistance to heat and to light, (5) that the dye exhibits high sensitivity, and (6) that the dye as a compound excels in economy in association with a process for production.

Optical recording media using organic dyes which have been developed in recent years with a view to satisfying these characteristics have been studied. In this respect, such organic dyes as phthalocyanine dyes, polymethine dyes, squalium dyes, and anthraquinone dyes have been proposed. None of the dyes heretofore proposed, however, satisfies all the characteristics mentioned above.

JP-A-58-169,152, JP-A-62-21,584, and JP-A-63-102, 988, for example, disclose methods which use anthraquinone compounds as dyes. These compounds, however, cannot be used practically because they are particularly deficient in lightfastness.

The color filter is generally constructed by repeating sequential superposition of fine colored picture elements in the form of thin films tinted in a plurality of colors on a substrate such as glass, plastic, camera element, or thin-film transistor and optionally further depositing a protective film thereon. Various methods have been proposed for the formation of such colored picture elements as mentioned above. For example, photolithographic methods, printing methods, electrodeposition methods, and vacuum deposition methods have been developed and adopted for practical use.

The color filters which are produced as described above are broadly divided under those of the class using the three primary colors of red, green, and blue and those of the class using the complementary colors of cyan, yellow, and magenta or the combination of two of these complementary colors with a transparent layer. In either case, it goes without saying that the spectral characteristics of a given color filter discriminate between acceptability and rejectability of the repeatability of color of the color liquid crystal display and the color grade solid camera element. Attempts has been made to develop dyes, pigments, or the combinations thereof which permit production of color filters possessing excellent spectral characteristics.

The dyes, pigments, and combinations thereof which have been developed heretofore, however, are at a disadvantage in being deficient in transparency and lightfastness and incapable of producing desired color tones or manifesting ample repeatability.

The ink jet grade inks in many cases provide critical print characteristics. To be specific, water-based ink jet grade inks generally manifest no affinity for paper and exhibit only a poor ability to permeate in a paper or dry in a paper. On the contrary, oil-based inks exhibit affinity for paper and are nevertheless at a disadvantage in being deficient in surface tension and consequently liable to form unduly large ink dots and impair the print quality. In contrast thereto, solid or semi-solid type inks are characterized by being capable of producing prints of excellent contrast and have prospects of bright future. None of the dyes or pigments which are available for solid or semi-solid type inks, however, satisfies the two factors of lightfastness and color tone at the same time.

An object of this invention, therefore, is to provide a novel quinizarin compound, a method for the production thereof, a dye formed of the compound, and an electrographic grade color toner composition, a thermal-transfer recording sheet, an optical recording medium, a color filter, and an ink jet grade ink composition severally containing the compound.

Another object of this invention is to provide a novel quinizarin type compound which is one species of anthraquinone type compounds and which constitutes a visible light absorption material permitting control to an absorption wavelength fit for an intended application within the range of absorption wavelength from 480 to 700 nm and excelling in solubility in a solvent or a resin used in the intended application and in lightfastness as well.

A further object of this invention is to provide a method for producing the quinizarin type compound with high efficiency.

Still another object of this invention is to provide a dye formed of the compound mentioned above and used as for a visible light absorption material.

Yet another object of this invention is to provide an electrophotographic grade color toner composition which, owing to the use of the dye possessing solubility in or miscibility with a binder resin, serves as a magenta and/or cyan color toner satisfying all the factors of transparency, color tone, and lightfastness.

Another object of this invention is to provide a dye satisfying all the conditions of (1) color tone, (2) solubility in or compatibility with an ink solvent and an ink grade binder resin, (3) resistance to heat, (4) transferability, and (5) lightfastness which are necessary for the magenta and/or cyan dye in a thermal-transfer recording sheet, and a thermal-transfer recording sheet containing the dye.

Yet another object of this invention is to provide a novel optical recording medium, particularly a CD-oriented optical recording medium which uses a laser with a wavelength of 780 nm or 680 nm, which excels in absorption wavelength, sensitivity, reflectance, and lightfastness owing to the use of a novel anthraquinone compound permitting control to an absorption wavelength fit for an intended application within the range of absorption wavelength of from 600 to 850 nm, excelling in solubility in a solvent such as, for example, an alcoholic solvent fit for the intended application, and abounding in lightfastness and resistance to heat.

Another object of this invention is to provide a color filter exhibiting excellent lightfastness, showing no turbidity, diffusing sensation of transparency, and excelling further in terms of color tone.

Still another object of this invention is to provide an ink jet grade ink composition which permits production of prints of ideal contrast and production of recorded images excelling in lightfastness and in color tone as well.

SUMMARY OF THE INVENTION

The various objects mentioned above are accomplished by a quinizarin compound which has a quinizarin structure represented by a following formula (1) having one to four of the 5, 6, 7, and 8 positions and at least either the 6 or 7 position formed of at least one member selected from the class consisting of secondary amino groups, alkylthio groups, and optionally substituted phenylthio groups, and having the remaining positions thereof formed of at least one member selected from the class consisting of hydrogen atom, halogen atoms, amino group, hydroxy group, alkoxy groups, and optionally substituted phenoxy groups.

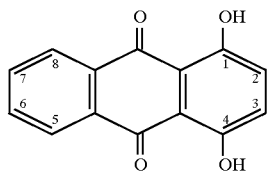

(1)

This invention concerns the quinizarin compound, wherein one to three of the 5, 6, 7, and 8 positions and at least either the 6 or 7 position of the quinizarin structure are formed of secondary amino groups and the remaining positions thereof are formed of at least one member selected from the class consisting of hydrogen atom, halogen atoms, hydroxy group, alkoxy groups, optionally substituted phenoxy groups, alkylthio groups, and optionally substituted phenylthio groups.

This invention also concerns the quinizarin compound, wherein at least one of the secondary amino groups is an anilino group which may contain a substituent. This invention further concerns the quinizarin compound, wherein the substituent of the anilino group is at least one member selected from the class consisting of optionally esterified carboxyl groups, sulfonic group, cyano group, alkyl groups, alkoxy groups, and halogen atoms. This invention further concerns the quinizarin compound, wherein the 2 and 6 positions of the anilino group are both substituted. This invention further concerns the quinizarin compound, wherein the positions other than those formed of the secondary amino groups are formed of fluorine atoms. This invention further concerns the quinizarin compound, wherein the number of secondary amino groups is 1 or 2, the number of alkoxy groups or optionally substituted phenoxy groups is 1 or 2, and the remaining positions are formed of fluorine atoms.

The objects are also accomplished by a magenta dye comprising the quinizarin compound containing one secondary amino group.

The objects are further accomplished by a cyan dye comprising the quinizarin compound containing two secondary amino groups.

The objects are also accomplished by an electrophotographic grade color toner composition comprising at least one coloring agent selected from the group consisting of the magenta dye and the cyan dye and a binder resin.

The objects are further accomplished by a thermal-transfer recording sheet characterized by possessing a coloring material layer containing at least one dye selected from the group consisting of the magenta dye and the cyan dye on a substrate.

The objects are also accomplished by an optical recording medium having the quinizarin compound contained in a recording layer formed on a substrate.

The objects are further accomplished by an ink jet grade ink composition comprising at least one dye selected from the group consisting of the magenta dye and the cyan dye and a vehicle.

This invention also concerns the ink jet grade ink composition, wherein the vehicle contains wax.

The objects are also accomplished by a color filter containing the quinizarin compound in a filter substrate.

The objects are further accomplished by a color filter containing at least one dye selected from the group consisting of the magenta dye and the cyan dye in a filter substrate.

The objects are furthermore accomplished by a method for the production of a quinizarin compound, characterized by causing a quinizarin compound which has a quinizarin structure having one to four of the 5, 6, 7, and 8 positions and at least either the 6 or 7 position formed of a halogen atom to react with at least one member selected from the class consisting of primary amine compounds, aliphatic mercapto compounds, optionally substituted phenylthiols, ammonia, water, aliphatic hydroxy compounds, and optionally substituted phenols.

The objects are also accomplished by a method for the production of a quinizarin compound, characterized by causing a phthalic anhydride derivative which has a phthalic anhydride structure having one to four of the 3, 4, 5, and 6 positions and at least either the 4 or 5 position formed of at least one member selected from the class consisting of secondary amino groups, alkylthio groups, and optionally substituted phenylthio groups and having the remaining positions formed of at least one member selected from the class consisting of hydrogen atom, halogen atoms, amino group, hydroxy group, alkoxy groups, and optionally substituted phenoxy groups to react with hydroquinone or 1,4-dimethoxybenzene.

BRIEF DESCRIPTION OF THE DRAWINGS

FIG. 1 is a chart showing the infrared spectrum of 6-(p-sodium sulfonate anilino)-5,7,8-trifluoroquinizarin.

EXPLANATION OF THE PREFERRED EMBODIMENT

The quinizarin compound according to this invention is a compound represented by the general formula (2):

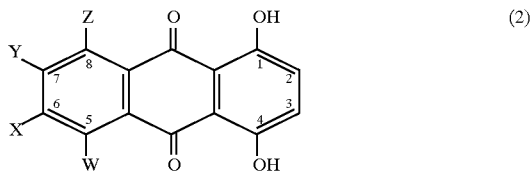

wherein one to four of the W, X, Y, and Z positions and at least either the X or Y position are formed of at least one member selected from the class consisting of secondary amino groups, alkylthio groups, and optionally substituted phenylthio groups and the remaining positions are formed of at least one member selected from the class consisting of hydrogen atom, halogen atoms, amino group, hydroxy group, alkoxy groups, and optionally substituted phenoxy groups.

At least one of the secondary amino groups is preferably an optionally substituted anilino group from the viewpoint of lightfastness. The substituent of the anilino group is at least one member selected from the class consisting of optionally esterified carboxyl groups, sulfonic group, cyano group, alkyl groups, alkoxy groups, and halogen atoms. An anilino group represented by the general formula (3):

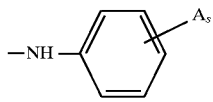

wherein A independently stands for at least one member selected from the class consisting of —COOR$^1$ (wherein R$^1$ stands for a hydrogen atom or an alkyl group of 1 to 18, preferably 1 to 12, carbon atoms), sulfonic group, cyano group, alkyl groups of 1 to 8, preferably 1 to 6, carbon atoms, alkoxy groups of 1 to 8, preferably 1 to 6 carbon atoms, and halogen atoms, and a is an integer in the range of 0 to 5, preferably 1 to 3) may be cited as one example. In this case, the anilino group is desired to have both the 2 and 6 positions thereof substituted with due consideration of solubility. In the general formula (3), the halogen atoms include, for example, a fluorine atom, a chlorine atom and a bromine atom. Among other halogen atoms cited above, a fluorine atom and a chlorine atom prove to be preferable.

As another example of the secondary amino group, —NHR$^2$ (wherein R$^2$ stands for an alkyl group of 1 to 18, preferably 1 to 12, carbon atoms) may be cited.

Among the aforementioned alkyl groups, alkyl groups having 1 to 6 carbon atoms include, for example, a methyl group, an ethyl group, a n-propyl group, an isopropyl group, a n-butyl group, an isobutyl group, a tertiary butyl group, a straight-chain or branched pentyl group, and a straight-chain or branched hexyl group. As the examples of the alkyl group having 1 to 8 carbon atoms, in addition to the alkyl groups cited above, a straight-chain or branched heptyl group and a straight-chain or branched octyl group can be cited. Further, as the examples of the alkyl group having 1 to 12 carbon atoms, in addition to the alkyl groups just cited above, a straight-chain or branched nonyl group, a straight-chain or branched decyl group, a straight-chain or branched undecyl group, and a straight-chain or -branched dodecyl group can be cited. Furthermore, as the examples of the alkyl group having 1 to 18 carbon atoms, in addition to the alkyl groups just cited above, a straight-chain or branched tridecyl group, a straight-chain or branched tetradecyl group, a straight-chain or branched pentadecyl group, a straight-chain or branched hexadecyl group, a straight-chain or branched heptadecyl group, and a straight-chain or branched octadecyl group can be cited.

Among the aforementioned alkoxy groups which are contained in "A" in the general formula (3), the alkoxy groups having 1 to 6 carbon atoms include, for example, a methoxy group, an ethoxy group, a n-propyloxy group, an isopropyloxy group, a n-butyloxy group, an isobutyloxy group, a tertiary butyloxy group, a straight-chain or branched pentyloxy group, and a straight-chain or branched hexyloxy group. As the examples of the alkoxy group having 1 to 8 carbon atoms, in addition to the alkoxy groups cited above, a straight-chain or branched heptyloxy group, and a straight-chain or branched octyloxy group can be cited.

The alkoxy group which can be a group at a remaining position in the general formula (2) is selected from among alkoxy groups having 1 to 12 carbon atoms, alkoxy groups having 1 to 5 ether bonds and a total carbon number in the range of 2 to 12, and alkoxy groups having an alkyl group with a heterocycle and a total carbon number in the range of 3 to 12. As the examples thereof, in addition to the alkoxy groups just cited above, a straight-chain or branched pentyloxy group, a straight-chain or branched hexyloxy group, a straight-chain or branched heptyloxy group, a straight-chain or branched octyloxy group, a straight-chain or branched nonyloxy group, a straight-chain or branched decyloxy group, a straight-chain or branched undecyloxy group, and a straight-chain or branched dodecyloxy group, and a methoxymethoxy group, a methoxyethoxy group, an ethoxyethoxy group, 3',6'-oxaheptyloxy group, 3',6'-oxaoctyloxy group, 3',6',9'-oxadecyloxy group, 3',6',9'-oxaundecyloxy group, 3',6',9',12'-oxatridecyloxy group, a methoxybutoxy group, an ethoxybutoxy group, 4',8',12'-oxatridecyloxy group, 4',8',12',16'-oxaheptadecyloxy group, a tetrahydrofurfuryloxy group, 4-morpholino ethoxy group and 1-piperazine ethoxy group can be cited, for example.

The optionally substituted phenoxy group which can be similarly a group at a remaining position in the general formula (2) is selected from among unsubstituted phenoxy groups and phenoxy groups substituted with one or two alkyl groups having 1 to 4 carbon atoms or one or two alkoxy groups having 1 to 4 carbon atoms at remaining positions of the benzene nucleus. As the examples thereof, a phenoxy group, an o-methylphenoxy group, a m-methylphenoxy group, a p-methylphenoxy group, an o-ethylphenoxy group, a m-ethylphenoxy group, a p-ethylphenoxy group, an o-propylphenoxy group, a m-propylphenoxy group, a p-propylphenoxy group, an o-isopropylphenoxy group, a m-isopropylphenoxy group, a p-isopropylphenoxy group, an o-butylphenoxy group, a m-butylphenoxy group, a p-butylphenoxy group, an o-tertiary butylphenoxy group, a m-tertiary butylphenoxy group, a p-tertiary butylphenoxy group, an o-methoxyphenoxy group, a m-methoxyphenoxy group, a p-methoxyphenoxy group, an o-ethoxyphenoxy group, a m-ethoxyphenoxy group, a p-ethoxyphenoxy group, an o-propioxyphenoxy group, a m-propioxyphenoxy group, a p-propioxyphenoxy group, an o-isopropioxyphenoxy group, a m-isopropioxyphenoxy group, a p-isopropioxyphenoxy group, an o-butoxyphenoxy group, a m-butoxyphenoxy group, a p-butoxyphenoxy group, a 2,6-dimethylphenoxy group, a 2,6-diethylphenoxy group, a 2,6-dipropylphenoxy group, a 2,6-diisopropylphenoxy group, a 2,6-dibutylphenoxy group, a 2,6-ditertiary butylphenoxy group, a 2,6-dimethoxyphenoxy group, a 2,6-diethoxyphenoxy group, a 2,6-dipropioxyphenoxy group, a 2,6- diisopropioxyphenoxy group, and a 2,6-dibutoxyphenoxy group can be cited.

As the examples of the halogen atoms which can be similarly a group at a remaining position in the general formula (2), a fluorine atom, a chlorine atom, and a bromine atom can be cited, for example. Among other halogen atoms cited above, a fluorine atom may be used preferably. In particular, by having remaining positions formed of fluorine atoms, the solubility of the quinizarin compound in a solvent or a resin can be effectively enhanced.

The alkylthio groups having 1 to 12 carbon atoms in the general formula (2) include, for example, a methylthio group, an ethylthio group, a n-propylthio group, an isopropylthio group, a n-butylthio group, an isobutylthio group, a tertiary butylthio group, a straight-chain or branched pentylthio group, a straight-chain or branched hexylthio group, a straight-chain or branched heptylthio group, and a straight-chain or branched octylthio group.

Similarly, the optionally substituted phenylthio group in the general formula (2) is an unsubstituted phenylthio group or a phenylthio group substituted with one to four groups selected from the group consisting of a methyl group, a hydroxy group, a methoxy group, a carboxyl group, a cyano group, a fluoro group at remaining positions of the benzene nucleus. As the examples thereof, a thiophenol group, an o-toluenethiol group, a m-toluenethiol group, a p-toluenethiol group, an o-hydroxythiophenol group, a m-hydroxythiophenol group, a p-hydroxythiophenol group, an o-methoxythiophenol group, a m-methoxythiophenol group, a p-methoxythiophenol group, a 4-carboxy-2,3,5,6-tetrafluorothiophenol group, a 4-cyano-2,3,5,6-tetrafluorothiophenol group can cited.

According to this invention, a substituent which is selected among amine type substituents of (a) type, (b) type, and (c) type and substituents of (d) type and (e) type as specifically described below is introduced into one or more positions of 5, 6, 7 or 8 of the structure of the quinizarin compound which is a certain kind of anthraquinone compound.

(a) type

Anilino group, o-ethoxy carbonyl anilino group, p-ethoxy carbonyl anilino group, m-ethoxy carbonyl anilino group, o-butoxy carbonyl anilino group, p-butoxy carbonyl anilino group, m-butoxy carbonyl anilino group, o-octyloxy carbonyl anilino group, p-octyloxy carbonyl anilino group, m-octyloxy carbonyl anilino group, o-octadecyloxy carbonyl anilino group, p-octadecyloxy carbonyl anilino group, m-octadecyloxy carbonyl anilino group, o-cyanoanilino group, p-cyanoanilino group, m-cyanoanilino group, o-nitroanilino group, p-nitroanilino group, m-nitroanilino group, o-methoxyanilino group, p-methoxyanilino group, m-methoxyanilino group, o-metylanilino group, p-metylanilino group, m-metylanilino group, o-tertiary butylanilino group, p-tertiary butylanilino group, m-tertiary butylanilino group, o-fluoroanilino group, p-fluoroanilino group, m-fluoroanilino group, 2,3,5,6-tetrafluoroanilino group, 4-cyano-2,3,5,6-tetrafluoroanilino group, 2-methyl-4-cyanoanilino group, 2-methyl-4-nitroanilino group, 2-methyl-4-carboxyanilino group, 2-methyl-4-methoxycarbonylanilino group, 2-butyl-4-nitroanilino group, 2-butyl-4-carboxyanilino group, 2-methoxy-4-cyanoanilino group, 2-methoxy-4-nitroanilino group, 2-methoxy-4-carboxyanilino group, 2-methoxy-4-methoxycarbonylanilino group, and 2,6-difluoroanilino group;

(b) type 2,6-Dimetylanilino group, 2,6-dietylanilino group, 2,6-dipropylanilino group, 2,6-diisopropylanilino group, 2,6-dibutylanilino group, 2,6-diisobutylanilino group, 2,6-ditertiary butylanilino group, 2,6-dihexylanilino group, 2,6-dioctylanilino group, 2,6-dimethoxyanilino group, 2,6-diethoxyanilino group, 2,6-dipropoxyanilino group, 2,6-diisopropoxyanilino group, 2,6-dibutoxyanilino group, 2,6-diisobutoxyanilino group, 2,6-ditertiary butoxyanilino group, 2,6-dihexyloxyanilino group, 2,6-dioctyloxyanilino group, 2,6-diethyl-3-chloroanilino group, 2,6-dichloroanilino group, 2,6-dibromoanilino group, 2-methyl-6-cyanoanilino group, 2-methyl-6-nitroanilino group, 2-methyl-6-carboxyanilino group, 2-methyl-6-methoxycarbonylanilino group, 2-methoxy-6-methylanilino group, and 2-chloro-6-methylanilino group, 4-cyano-2,6-dimethylanilino group, 4-cyano-2,6-diethylanilino group, 4-cyano-2,6-dipropylanilino group, 4-cyano-2,6-diisopropylanilino group, 4-cyano-2,6-dibutylanilino group, 4-cyano-2,6-diisobutylanilino group, 4-cyano-2,6-ditertiary butylanilino group, 4-cyano-2,6-dimethoxyanilino group, 4-cyano-2,6-diethoxyanilino group, 4-cyano-2,6-dipropoxyanilino group, 4-cyano-2,6-diisopropoxyanilino group, 4-cyano-2,6-dibutoxyanilino group, 4-cyano-2,6-diisobutoxyanilino group, and 4-cyano-2,6-ditertiary butoxyanilino group, 4-nitro-2,6-dimethylanilino group, 4-nitro-2,6-diethylanilino group, 4-nitro-2,6-dipropylanilino group, 4-nitro-2,6-diisopropylanilino group, 4-nitro-2,6-dibutylanilino group, 4-nitro-2,6-diisobutylanilino group, 4-nitro-2,6-ditertiary butylanilino group, 4-nitro-2,6-dimethoxyanilino group, 4-nitro-2,6-diethoxyanilino group, 4-nitro-2,6-dipropoxyanilino group, 4-nitro-2,6-diisopropoxyanilino group, 4-nitro-2,6-dibutoxyanilino group, 4-nitro-2,6-diisobutoxyanilino group, and 4-nitro-2,6-ditertiary butoxyanilino group, 4-ethoxycarbonyl-2,6-dimethylanilino group, 4-ethoxycarbonyl-2,6-diethylanilino group, 4-ethoxycarbonyl-2,6-dipropylanilino group, 4-ethoxycarbonyl-2,6-diisopropylanilino group, 4-ethoxycarbonyl-2,6-dibutylanilino group, 4-ethoxycarbonyl-2,6-diisobutylanilino group, 4-ethoxycarbonyl-2,6-ditertiary butylanilino group, 4-ethoxycarbonyl-2,6-dimethoxyanilino group, 4-ethoxycarbonyl-2,6-diethoxyanilino group, 4-ethoxycarbonyl- 2,6-dipropoxyanilino group, 4-ethoxycarbonyl-2,6-diisopropoxyanilino group, 4-ethoxycarbonyl-2,6-dibutoxyanilino group, 4-ethoxycarbonyl-2,6-diisobutoxyanilino group, and 4-ethoxycarbonyl-2,6-ditertiary butoxyanilino group;

(c) type

Amino group, methyl amino group, ethyl amino group, n-propyl amino group, isopropyl amino group, n-butyl amino group, isobutyl amino group, tertiary butyl amino group, hexyl amino group, octyl amino group, nonyl amino group, decyl amino group, dodecyl amino group, and cyclohexylamino group;

(d) type

Phenoxy group, o-methyl phenoxy group, m-methyl phenoxy group, p-methyl phenoxy group, o-methoxy phenoxy group, m-methoxy phenoxy group, and p-methoxy phenoxy group, methoxy group, ethoxy group, n-propyloxy group, isopropyloxy group, n-butyloxy group, isobutyloxy group, tertiary butyloxy group, pentyloxy group, hexyloxy group, heptyloxy group, octyloxy group, nonyloxy group, decyloxy group, and dodecyloxy group, methoxy methoxy group, methoxy ethoxy group, ethoxy ethoxy group, 3',6'-oxaheptyloxy group, 3',6'- oxaoctyloxy group, 3',6',9'-oxadecyloxy group, 3',6',9'-oxaundecyloxy group, 3',6',9',12'-oxatridecyloxy group, methoxy butoxy group, ethoxy butoxy group, 4',8',12'-oxatridecyloxy group, 4',8',12',16'-oxaheptadecyloxy group and tetrahydrofurfuryloxy group;

(e) type

Methylthio group, ethylthio group, propylthio group, isopropylthio group, butylthio group, isobutylthio group, tertiary butylthio group, hexylthio group, octylthio group, and nonylthio group, thiophenol group, o-toluene thiol group, m-toluene thiol group, p-toluene thiol group, o-hydroxy thiophenol group, m-hydroxy thiophenol group, p-hydroxy thiophenol group, o-methoxy thiophenol group, m-methoxy thiophenol group, p-methoxy thiophenol group, 4-carboxy-2,3,5,6-tetrafluoro thiophenol group, 4-cyano-2,3,5,6-tetrafluoro thiophenol group.

The present inventors have found that the characteristics which are needed depending on each utility aimed at as described following can be added by introducing a substituent of type selected among the above-mentioned (a) to (d) types into 5, 6, 7 and/or 8 position of the quinizarin structure and preferably, a fluorine atom into the remaining positions.

To be specific, substituent(s) of (a), (b) and (c) types are mainly used preferably when an absorption wavelength is shifted to a longer wavelength side [(b) type is particularly preferable]. In this case, the width of shift is varied with the kind and number of the substituent. More specifically, in the absorption wavelength in the range of 480 nm to 850 nm, it may be controlled by the kind and number of the substituent.

The substituent(s) of (d) type is preferably introduced into the position(s) mainly for the purpose of remarkably improving a solubility. By the use of the substituent of such a type, a high concentration of quinizarin compound can be dissolved in such a solvent as ketone type solvents, e.g., acetone and methyl ethyl ketone, hydrocarbon solvents, e.g., benzene, toluene and xylene, and halogen type solvents, e.g., chloroform and dichloroethane. With the number of substituent increased, the solubility thereof is improved.

The substituent(s) of (e) type is preferably introduced into the position(s) for the purpose of improving a solubility, as well as controlling an absorption wavelength within a small range.

By introducing these substituents with any combination, the quinizarin compound can be dissolved at a high concentration in such a solvent as ketone type solvents, e.g., acetone and methyl ethyl ketone, hydrocarbon solvents, e.g., benzene, toluene and xylene, and halogen type solvents, e.g., chloroform and dichloroethane, and at the same time, the absorption wavelength thereof can be controlled within the range of 480 nm to 850 nm by the kind and number of the substituent. In particular, when a quinizarin compound having a red-type visible light range is to be obtained, one substituent of type (a) is preferably introduced into the positions thereof in combination with one or two substituents of type (d), or one substituent of type (b) is preferably introduced thereinto.

When a quinizarin compound having a blue-type visible light range is to be obtained, one substituent of type (a) and one substituent of type (c) are preferably introduced into the positions thereof in combination with one or two substituents of type (d), or two substituents of type (a) are preferably introduced into the positions thereof in combination with one or two substituents of type (d), or two substituents of type (b) are preferably introduced thereinto.

When a quinizarin compound having a wavelength longer than a blue-type one (near infrared range) is to be obtained, two or three substituents of type (a), (b) or (c) are preferably introduced into the positions thereof and, If necessary, in combination with one or two substituents of type (d) or (e).

In the case of introducing substituent(s) of any of the types (a) to (e), the substituent(s) are introduced more preferably into 6 and/or 7 position(s) of the quinizarin compound than into 5 and/or 8 position(s) thereof, because of the more excellent light-resistance.

The examples of the quinizarin compound of this invention may cited as following.

(I) In the case of the presence of a secondary amino group at 6 position.

A. Examples of the quinizarin compound having one secondary amino group (anilino group) at 6 position, and fluorine atoms at remaining positions:

(1) 6-anilino-5,7,8-trifluoroquinizarin,
(2) 6-(o-ethoxycarbonylanilino)-5,7,8-trifluoroquinizarin,
(3) 6-(p-ethoxycarbonylanilino)-5,7,8-trifluoroquinizarin,
(4) 6-(m-ethoxycarbonylanilino)-5,7,8-trifluoroquinizarin,
(5) 6-(o-butoxycarbonylanilino)-5,7,8-trifluoroquinizarin,
(6) 6-(p-butoxycarbonylanilino)-5,7,8-trifluoroquinizarin,
(7) 6-(m-butoxycarbonylanilino)-5,7,8-trifluoroquinizarin,
(8) 6-(m-octyloxycarbonylanilino)-5,7,8-trifluoroquinizarin,
(9) 6-(o-cyanoanilino)-5,7,8-trifluoroquinizarin,
(10) 6-(p-cyanoanilino)-5,7,8-trifluoroquinizarin,
(11) 6-(o-nitroanilino)-5,7,8-trifluoroquinizarin,
(12) 6-(p-nitroanilino)-5,7,8-trifluoroquinizarin,
(13) 6-(p-tertiary butylanilino)-5,7,8-trifluoroquinizarin,
(14) 6-(o-methoxylanilino)-5,7,8-trifluoroquinizarin,
(15) 6-(p-methoxylanilino)-5,7,8-trifluoroquinizarin,
(16) 6-(m-methoxylanilino)-5,7,8-trifluoroquinizarin,
(17) 6-(2,6-dimethylanilino)-5,7,8-trifluoroquinizarin,
(18) 6-(2,6-diethylanilino)-5,7,8-trifluoroquinizarin,
(19) 6-(2,6-dibutylanilino)-5,7,8-trifluoroquinizarin,
(20) 6-(2-methyl-6-nitroanilino)-5,7,8-trifluoroquinizarin,
(21) 6-(2-methyl-6-carboxyanilino)-5,7,8-trifluoroquinizarin,
(22) 6-(2,6-dichloroanilino)-5,7,8-trifluoroquinizarin,
(23) 6-(2-chloro-6-methylanilino)-5,7,8-trifluoroquinizarin,
(24) 6-(2,3,5,6-tetrafluoroanilino)-5,7,8-trifluoroquinizarin,
(25) 6-(2,6-diisopropylanilino)-5,7,8-trifluoroquinizarin,
(26) 6-(p-sulfoanilino)-5,7,8-trifluoroquinizarin,
(27) 6-(p-sodiumsulfonateanilino)-5,7,8-trifluoroquinizarin;

B. Examples of the quinizarin compound having one secondary amino group (anilino group) at 6 position, and alkoxy groups and fluorine atoms at remaining positions:

(28) 6-anilino-7-butoxy-5,8-difluoroquinizarin,
(29) 6-(o-ethoxycarbonylanilino)-7-butoxy-5,8-difluoroquinizarin,
(30) 6-(p-ethoxycarbonylanilino)-7-butoxy-5,8-difluoroquinizarin,
(31) 6-(m-ethoxycarbonylanilino)-7-butoxy-5,8-difluoroquinizarin,
(32) 6-(o-ethoxycarbonylanilino)-7-octyloxy-5,8-difluoroquinizarin,
(33) 6-(p-ethoxycarbonylanilino)-7-octyloxy-5,8-difluoroquinizarin,
(34) 6-(m-ethoxycarbonylanilino)-7-octyloxy-5,8-difluoroquinizarin,
(35) 6-(o-butoxycarbonylanilino)-7-octyloxy-5,8-difluoroquinizarin,
(36) 6-(p-butoxycarbonylanilino)-7-octyloxy-5,8-difluoroquinizarin,
(37) 6-(m-butoxycarbonylanilino)-7-octyloxy-5,8-difluoroquinizarin,
(38) 6-(o-nitroanilino)-7-butoxy-5,8-difluoroquinizarin,
(39) 6-(m-nitroanilino)-7-butoxy-5,8-difluoroquinizarin,

(40) 6-(p-nitroanilino)-7-butoxy-5,8-difluoroquinizarin,
(41) 6-(p-nitroanilino)-7-octyloxy-5,8-difluoroquinizarin,
(42) 6-(o-cyanoanilino)-7-butoxy-5,8-difluoroquinizarin,
(43) 6-(m-cyanoanilino)-7-butoxy-5,8-difluoroquinizarin,
(44) 6-(p-cyanoanilino)-7-butoxy-5,8-difluoroquinizarin,
(45) 6-(p-cyanoanilino)-7-octyloxy-5,8-difluoroquinizarin,
(46) 6-(2,6-dimethylanilino)-7-methoxy-5,8-difluoroquinizarin,
(47) 6-(2,6-dimethylanilino)-7-butoxy-5,8-difluoroquinizarin,
(48) 6-(2,6-dimethylanilino)-7-octyloxy-5,8-difluoroquinizarin,
(49) 6-(2,6-diethylanilino)-7-methoxy-5,8-difluoroquinizarin,
(50) 6-(2,6-diethylanilino)-7-butoxy-5,8-difluoroquinizarin,
(51) 6-(2,6-diethylanilino)-7-octyloxy-5,8-difluoroquinizarin,
(52) 6-(2-nitro-6-methylanilino)-7-methoxy-5,8-difluoroquinizarin,
(53) 6-(2-nitro-6-methylanilino)-7-butoxy-5,8-difluoroquinizarin,
(54) 6-(2-nitro-6-methylanilino)-7-octyloxy-5,8-difluoroquinizarin,
(55) 6-(2-carboxy-6-methylanilino)-7-octyloxy-5,8-difluoroquinizarin,
(56) 6-(2,6-dichloroanilino)-7-methoxy-5,8-difluoroquinizarin,
(57) 6-(2,6-dichloroanilino)-7-butoxy-5,8-difluoroquinizarin,
(58) 6-(2,6-dichloroanilino)-7-octyloxy-5,8-difluoroquinizarin,
(59) 6-(2-chloro-6-methylanilino)-7-methoxy-5,8-difluoroquinizarin,
(60) 6-(2-chloro-6-methylanilino)-7-butoxy-5,8-difluoroquinizarin,
(61) 6-(2-chloro-6-methylanilino)-7-octyloxy-5,8-difluoroquinizarin,
(62) 6-(2,3,5,6-tetrafluoroanilino)-7-methoxy-5,8-difluoroquinizarin,
(63) 6-(2,3,5,6-tetrafluoroanilino)-7-butoxy-5,8-difluoroquinizarin,
(64) 6-(2,3,5,6-tetrafluoroanilino)-7-octyloxy-5,8-difluoroquinizarin,
(65) 6-anilino-5(or 8),7-dibutoxy-8(or 5)-fluoroquinizarin,
(66) 6-anilino-5(or 8),7-dioctyloxy-8(or 5)-fluoroquinizarin,
(67) 6-(o-ethoxycarbonylanilino)-5(or 8),7-dibutoxy-8(or 5)-fluoroquinizarin,
(68) 6-(p-ethoxycarbonylanilino)-5(or 8),7-dibutoxy-8(or 5)-fluoroquinizarin,
(69) 6-(m-butoxycarbonylanilino)-5(or 8),7-dibutoxy-8(or 5)-fluoroquinizarin,
(70) 6-(p-butoxycarbonylanilino)-5(or 8),7-dioctyloxy-8(or 5)-fluoroquinizarin,
(71) 6-(o-nitroanilino)-5(or 8),7-dibutoxy-8(or 5)-fluoroquinizarin,
(72) 6-(p-nitroanilino)-5(or 8),7-dibutoxy-8(or 5)-fluoroquinizarin,
(73) 6-(m-nitroanilino)-5(or 8),7-dibutoxy-8(or 5)-fluoroquinizarin,
(74) 6-(o-cyanoanilino)-5(or 8),7-dibutoxy-8(or 5)-fluoroquinizarin,
(75) 6-(p-cyanoanilino)-5(or 8),7-dibutoxy-8(or 5)-fluoroquinizarin,
(76) 6-(m-cyanoanilino)-5(or 8),7-dibutoxy-8(or 5)-fluoroquinizarin;

C. Examples of the quinizarin compound having one secondary amino group (anilino group) at 6 position, and hydrogen atoms at remaining positions:
(77) 6-anilinoquinizarin,
(78) 6-(o-ethoxycarbonylanilino)quinizarin,
(79) 6-(m-ethoxycarbonylanilino)quinizarin,
(80) 6-(p-ethoxycarbonylanilino)quinizarin,
(81) 6-(o-butoxycarbonylanilino)quinizarin,
(82) 6-(m-butoxycarbonylanilino)quinizarin,
(83) 6-(p-butoxycarbonylanilino)quinizarin,
(84) 6-(o-octyloxycarbonylanilino)quinizarin,
(85) 6-(m-octyloxycarbonylanilino)quinizarin,
(86) 6-(p-octyloxycarbonylanilino)quinizarin,
(87) 6-(o-cyanoanilino)quinizarin,
(88) 6-(m-cyanoanilino)quinizarin,
(89) 6-(p-cyanoanilino)quinizarin,
(90) 6-(o-nitroanilino)quinizarin,
(91) 6-(m-nitroanilino)quinizarin,
(92) 6-(p-nitroanilino)quinizarin,
(93) 6-(o-methoxyanilino)quinizarin,
(94) 6-(m-methoxyanilino)quinizarin,
(95) 6-(p-methoxyanilino)quinizarin,
(96) 6-(2,6-dimethylanilino)quinizarin,
(97) 6-(2,6-diethylanilino)quinizarin,
(98) 6-(2,6-dipropylanilino)quinizarin,
(99) 6-(2,6-diisopropylanilino)quinizarin,
(100) 6-(2,6-dibutylanilino)quinizarin,
(101) 6-(2,6-ditertiary butylanilino)quinizarin,
(102) 6-(2,6-dichloroanilino)quinizarin,
(103) 6-(2-chloro-6-methylanilino)quinizarin,
(104) 6-(2-methyl-6-nitroanilino)quinizarin,
(105) 6-(2-methyl-6-carboxyanilino)quinizarin,
(106) 6-(2,3,4,5-tetrafluoroanilino)quinizarin;

D. Examples of the quinizarin compound having one secondary amino group (anilino group) at 6 position, and phenoxy groups and fluorine atoms at remaining positions:
(107) 6-anilino-7-phenoxy-5,8-difluoroquinizarin,
(108) 6-(p-cyanoanilino)-7-phenoxy-5,8-difluoroquinizarin,
(109) 6-(m-ethoxycarbonylanilino)-7-phenoxy-5,8-difluoroquinizarin,
(110) 6-(2,6-dichloroanilino)-7-phenoxy-5,8-difluoroquinizarin;

E. Examples of the quinizarin compound having one secondary amino group (anilino group) at 6 position, and alkoxy groups at remaining positions:
(111) 6-(m-ethoxycarbonylanilino)-5,7,8-tributoxyquinizarin;

F. Examples of the quinizarin compound having one secondary amino group (anilino group) at 6 position, and phenylthio groups and fluorine atoms at remaining positions:
(112) 6-anilino-7-phenylthio-5,8-difluoroquinizarin,
(113) 6-cyanoanilino-7-phenylthio-5,8-difluoroquinizarin,
(114) 6-(2,6-dichloroanilino)-7-phenylthio-5,8-difluoroquinizarin,
(115) 6-(m-ethoxycarbonyl)-7-phenylthio-5,8-difluoroquinizarin;

G. Examples of the quinizarin compound having one secondary amino group (alkylamino group) at 6 position, and fluorine atoms at remaining positions:
(116) 6-ethylamino-5,7,8-trifluoroquinizarin,
(117) 6-butylamino-5,7,8-trifluoroquinizarin,
(118) 6-octylamino-5,7,8-trifluoroquinizarin,
(119) 6-cyclohexylamino-5,7,8-trifluoroquinizarin;

H. Examples of the quinizarin compound having two secondary amino groups (anilino groups) at at least 6 position, and fluorine atoms at remaining positions:
(120) 6,7-dianilino-5,8-difluoroquinizarin,
(121) 6,7-bis(m-ethoxycarbonylanilino)-5,8-difluoroquinizarin, (122) 6,7-bis(o-butoxycarbonylanilino)-5,8-difluoroquinizarin,
(123) 6,7-bis(p-butoxycarbonylanilino)-5,8-difluoroquinizarin,
(124) 6,7-bis(m-butoxycarbonylanilino)-5,8-difluoroquinizarin,
(125) 6,7-bis(o-cyanoanilino)-5,8-difluoroquinizarin,
(126) 6,7-bis(p-cyanoanilino)-5,8-difluoroquinizarin,
(127) 6,7-bis(o-nitroanilino)-5,8-difluoroquinizarin,
(128) 6,7-bis(p-nitroanilino)-5,8-difluoroquinizarin,
(129) 6,7-bis(o-tertiary butylanilino)-5,8-difluoroquinizarin,
(130) 6,7-bis(p-tertiary butylanilino)-5,8-difluoroquinizarin,
(131) 6,7-bis(o-methoxyanilino)-5,8-difluoroquinizarin,
(132) 6,7-bis(p-methoxyanilino)-5,8-difluoroquinizarin,
(133) 6,7-bis(m-methoxyanilino)-5,8-difluoroquinizarin,
(134) 6,7-bis(2,6-dibutylanilino)-5,8-difluoroquinizarin,
(135) 6,7-bis(2,6-difluoroanilino)-5,8-difluoroquinizarin,
(136) 6,7-bis(2,6-dimetylanilino)-5,8-difluoroquinizarin,
(137) 6,7-bis(2,6-dietylanilino)-5,8-difluoroquinizarin,
(138) 6,7-bis(2,6-dichloroanilino)-5,8-difluoroquinizarin,
(139) 6,7-bis(2,6-diisopropylanilino)-5,8-difluoroquinizarin,
(140) 6,7-bis(2,6-dibromoanilino)-5,8-difluoroquinizarin,
(141) 6,7-bis(2,6-diethyl-3-chloroanilino)-5,8-difluoroquinizarin,
(142) 6,7-bis(2-methoxy-6-methylanilino)-5,8-difluoroquinizarin,
(143) 6,7-bis(2-chloro-6-methylanilino)-5,8-difluoroquinizarin,
(144) 6,7-bis(2-ethoxycarbonyl-6-methylanilino)-5,8-difluoroquinizarin,
(145) 6,7-bis(2,3,5,6-tetrafluoroanilino)-5,8-difluoroquinizarin,
(146) 6,7-bis(2-chloro-6-methylanilino)-5,8-difluoroquinizarin,
(147) 6,7-bis(o-octyloxycarbonylanilino)-5,8-difluoroquinizarin,
(148) 6,7-bis(o-octadecyloxycarbonylanilino)-5,8-difluoroquinizarin,
(149) 6,7-bis(4-ethoxy-2,6-dipropylanilino)-5,8-difluoroquinizarin,
(150) 6,7-bis(4-methoxyethoxy-2,6-diisopropylanilino)-5,8-difluoroquinizarin,
(151) 6,7-bis(4-hydroxy-2,6-dibutylanilino)-5,8-difluoroquinizarin,
(152) 6,7-bis(2-ethoxy-6-methylanilino)-5,8-difluoroquinizarin,
(153) 6,7-bis(2,6-diethoxyanilino)-5,8-difluoroquinizarin;

I. Examples of the quinizarin compound having two secondary amino groups (anilino groups) at at least 6 position, and alkoxy groups and fluorine atoms at remaining positions:
(154) 6,7-dianilino-5-butoxy-8-fluoroquinizarin,
(155) 6,7-dianilino-5-octyloxy-8-fluoroquinizarin,
(156) 6,7-bis(m-ethoxycarbonylanilino)-5-octyloxy-8-fluoroquinizarin,
(157) 6,7-bis(p-ethoxycarbonylanilino)-5-octyloxy-8-fluoroquinizarin,
(158) 6,7-bis(2,6-diethylanilino)-5-butoxy-8-fluoroquinizarin,
(159) 6,7-bis(2,6-diisopropylanilino)-5-butoxy-8-fluoroquinizarin,
(160) 6,7-bis(2,6-diethyl-3-chloroanilino)-5-butoxy-8-fluoroquinizarin,
(161) 6,7-bis(2,6-diethyl-3-chloroanilino)-5-octyloxy-8-fluoroquinizarin,
(162) 6,7-bis(2-ethoxycarbony-6-methylanilino)-5-butoxy-8-fluoroquinizarin,
(163) 6,7-bis(2-ethoxycarbony-6-methylanilino)-5-octyloxy-8-fluoroquinizarin,
(164) 6,7-bis(2,6-dimethylanilino)-5-octyloxy-8-fluoroquinizarin,
(165) 6,7-bis(2,6-diethylanilino)-5-octyloxy-8-fluoroquinizarin,
(166) 6,7-bis(o-ethoxyanilino)-5-butoxy-8-fluoroquinizarin,
(167) 6,7-bis(p-ethoxyanilino)-5-butoxy-8-fluoroquinizarin,
(168) 6,7-bis(p-ethoxyanilino)-5-ethoxyethoxy-8-fluoroquinizarin,
(169) 6,7-bis(o-ethoxyanilino)-5-octyloxy-8-fluoroquinizarin,
(170) 6,7-bis(p-methoxyethoxyanilino)-5-octyloxy-8-fluoroquinizarin,
(171) 6,7-bis(p-ethoxyethoxyanilino)-5-ethoxyethoxy-8-fluoroquinizarin,
(172) 6,7-bis(o-butoxyanilino)-5-(p-3',6',9'-oxahendecyloxy)-8-fluoroquinizarin,
(173) 6,7-bis(p-butoxyanilino)-5-ethoxyethoxy-8-fluoroquinizarin,
(174) 6,7-bis(p-hydroxyanilino)-5-butoxy-8-fluoroquinizarin,
(175) 6,7-bis(o-butylanilino)-5-octyloxy-8-fluoroquinizarin,
(176) 6,7-bis(p-octyloxyanilino)-5-octyloxy-8-fluoroquinizarin,
(177) 6,7-bis(p-3',6',9'-oxahendecyloxyanilino)-5-octyloxy-8-fluoroquinizarin,
(178) 6,7-bis(2,6-dipropylanilino)-5-butoxy-8-fluoroquinizarin,
(179) 6,7-bis(2,6-dibutylanilino)-5-butoxy-8-fluoroquinizarin,
(180) 6,7-bis(2,6-diisopropylanilino)-5-methoxyethoxy-8-fluoroquinizarin,
(181) 6,7-bis(2,6-difluoroanilino)-5-octyloxy-8-fluoroquinizarin,
(182) 6,7-bis(2,6-dichloroanilino)-5-butoxy-8-fluoroquinizarin,
(183) 6,7-bis(2,6-dichloroanilino)-5-octyloxy-8-fluoroquinizarin,
(184) 6,7-bis(2,6-dibromoanilino)-5-butoxy-8-fluoroquinizarin,
(185) 6,7-bis(2,6-dibromoanilino)-5-octyloxy-8-fluoroquinizarin,
(186) 6,7-bis(2-methoxy-6-methylanilino)-5-butoxy-8-fluoroquinizarin,
(187) 6,7-bis(2-methoxy-6-methylanilino)-5-octyloxy-8-fluoroquinizarin,
(188) 6,7-bis(2-chloro-6-methylanilino)-5-butoxy-8-fluoroquinizarin,
(189) 6,7-bis(2-chloro-6-methylanilino)-5-octyloxy-8-fluoroquinizarin,
(190) 6,7-bis(2-ethoxy-6-methylanilino)-5-butoxy-8-fluoroquinizarin,
(191) 6,7-bis(2-ethoxy-6-methylanilino)-5-octyloxy-8-fluoroquinizarin;

J. Examples of the quinizarin compound having two secondary amino groups (anilino group and alkylamino group) at at least 6 position, and alkoxy groups and fluorine atoms at remaining positions:
(192) 6-anilino-7-ethylamino-5(or 8)-octyloxy-8(or 5)-fluoroquinizarin,
(193) 6-anilino-7-butylamino-8(or 5)-octyloxy-5(or 8)-fluoroquinizarin,
(194) 6-(m-ethoxycarbonylanilino)-7-butylamino-5(or 8)-butoxy-8(or 5)-fluoroquinizarin,
(195) 6-(o-ethoxycarbonylanilino)-7-butylamino-8(or 5)-octyloxy-5(or 8)-fluoroquinizarin, (196) 6-(p-ethoxycarbonylanilino)-7-butylamino-8(or 5)-octyloxy-5(or 8)-fluoroquinizarin,
(197) 6-(m-ethoxycarbonylanilino)-7-butylamino-8(or 5)-octyloxy-5(or 8)-fluoroquinizarin,
(198) 6-(o-cyanoanilino)-7-butylamino-8(or 5)-octyloxy-5(or 8)-fluoroquinizarin,
(199) 6-(p-cyanoanilino)-7-butylamino-8(or 5)-octyloxy-5(or 8)-fluoroquinizarin,
(200) 6-(m-cyanoanilino)-7-butylamino-8(or 5)-octyloxy-5(or 8)-fluoroquinizarin,
(201) 6-(o-nitroanilino)-7-butylamino-8(or 5)-octyloxy-5(or 8)-fluoroquinizarin,
(202) 6-(p-nitroanilino)-7-butylamino-8(or 5)-octyloxy-5(or 8)-fluoroquinizarin,
(203) 6-(m-nitroanilino)-7-butylamino-8(or 5)-octyloxy-5(or 8)-fluoroquinizarin,
(204) 6-anilino-7-butylamino-5(or 8)-butoxy-8(or 5)-fluoroquinizarin,
(205) 6-(o-ethoxyanilino)-7-butylamino-5(or 8)-butyloxy-8(or 5)-fluoroquinizarin,
(206) 6-(o-butoxyanilino)-7-butylamino-5(or 8)-butyloxy-8(or 5)-fluoroquinizarin,
(207) 6-(p-ethoxyanilino)-7-butylamino-5(or 8)-butyloxy-8(or 5)-fluoroquinizarin,
(208) 6-(o-ethoxyanilino)-7-butylamino-5(or 8)-octyloxy-8(or 5)-fluoroquinizarin,
(209) 6-(o-ethoxyanilino)-7-butylamino-5(or 8)-methoxyethoxy-8(or 5)-fluoroquinizarin,
(210) 6-(p-ethoxyanilino)-7-butylamino-5(or 8)-ethoxyethoxy-8(or 5)-fluoroquinizarin,
(211) 6-(o-methoxyethoxyanilino)-7-butylamino-5(or 8)-butyloxy-8(or 5)-fluoroquinizarin,
(212) 6-(p-ethoxyethoxyanilino)-7-butylamino-5(or 8)-methoxymethoxy-8(or 5)-fluoroquinizarin,
(213) 6-(p-butoxyanilino)-7-butylamino-5(or 8)-3',6',9'-oxahendecyloxy-8(or 5)-fluoroquinizarin,
(214) 6-(o-butoxyanilino)-7-butylamino-5(or 8)-octyloxy-8(or 5)-fluoroquinizarin,
(215) 6-(p-butoxyanilino)-7-butylamino-5(or 8)-phenyloxy-8(or 5)-fluoroquinizarin,
(216) 6-(p-butoxyanilino)-7-butylamino-5(or 8)-octyloxy-8(or 5)-fluoroquinizarin;

K. Examples of the quinizarin compound having two secondary amino groups (anilino group and alkylamino group) at at least 6 position, and alkoxy groups at remaining positions:
(217) 6-anilino-7-butylamino-5,8-dibutoxyquinizarin,
(218) 6-(o-ethoxycarbonylanilino)-7-butylamino-5,8-dibutoxyquinizarin,
(219) 6-(p-ethoxycarbonylanilino)-7-butylamino-5,8-dibutoxyquinizarin,
(220) 6-(m-ethoxycarbonylanilino)-7-butylamino-5,8-dibutoxyquinizarin,
(221) 6-(o-cyanoanilino)-7-butylamino-5,8-dibutoxyquinizarin,
(222) 6-(p-cyanoanilino)-7-butylamino-5,8-dibutoxyquinizarin,
(223) 6-(m-cyanoanilino)-7-butylamino-5,8-dibutoxyquinizarin,
(224) 6-(o-nitroanilino)-7-butylamino-5,8-dibutoxyquinizarin,
(225) 6-(p-nitroanilino)-7-butylamino-5,8-dibutoxyquinizarin,
(226) 6-(m-nitroanilino)-7-butylamino-5,8-dibutoxyquinizarin;

L. Examples of the quinizarin compound having two secondary amino groups (anilino group and alkylamino group) at at least 6 position, and fluorine atoms at remaining positions:

(227) 6-(m-ethoxycarbonylanilino)-7-butylamino-5,8-difluoroquinizarin,
(228) 6-(p-methoxyanilino)-7-butylamino-5,8-difluoroquinizarin,
(229) 6-anilino-7-butylamino-5,8-difluoroquinizarin;

M. Examples of the quinizarin compound having two secondary amino groups (anilino groups) at at least 6 position, and hydroxy groups and fluorine atoms at remaining positions:
(230) 6,8(or 5)-bis(2,6-dichloroanilino)-7-hydroxy-5(or 8)-fluoroquinizarin,
(231) 6,8(or 5)-bis(2,6-diisopropylanilino)-7-hydroxy-5(or 8)-fluoroquinizarin;

N. Examples of the quinizarin compound having two secondary amino groups (anilino groups) at at least 6 position, and either alkylthio groups or phenylthio groups and fluorine atoms at remaining positions:
(232) 6,7-bis(2,6-diisopropylanilino)-5-octylthio-8-fluoroquinizarin,
(233) 6,7-bis(2,6-diethoxyanilino)-5-octylthio-8-fluoroquinizarin,
(234) 6,7-bis(2,6-diethoxyanilino)-5-phenylthio-8-fluoroquinizarin;

O. Examples of the quinizarin compound having two secondary amino groups (anilino groups) at at least 6 position, and either alkylthio groups or phenylthio groups at remaining positions:
(235) 6,7-bis(2,6-diethylanilino)-5,8-dibutylthioquinizarin,
(236) 6,7-bis(2,6-diisopropylanilino)-5,8-dibutylthioquinizarin,
(237) 6,7-bis(2,6-diisopropylanilino)-5,8-diphenylthioquinizarin,
(238) 6,7-bis(2,6-diisopropyl-4-ethoxyanilino)-5,8-dibutylthioquinizarin;

P. Examples of the quinizarin compound having two secondary amino groups (anilino group and alkylamino group) at at least 6 position, and either alkylthio groups or phenylthio groups and fluorine atoms at remaining positions:
(239) 6-(2,6-diisopropylanilino)-7-butylamino-5-octylthio-8-fluoroquinizarin,
(240) 6-(2,6-diethoxyanilino)-7-butylamino-5-octylthio-8-fluoroquinizarin,
(241) 6-(2,6-diethoxyanilino)-7-butylamino-5-phenylthio-8-fluoroquinizarin;

Q. Examples of the quinizarin compound having two secondary amino groups (alkylamino groups) at at least 6 position, and fluorine atoms at remaining positions:
(242) 6,7-dibutylamino-5,8-difluoroquinizarin;

R. Examples of the quinizarin compound having three secondary amino groups (anilino groups) at at least 6 position, and fluorine atoms at remaining positions:
(243) 5,6,7-tris(2,6-diethylanilino)-8-fluoroquinizarin,
(244) 5,6,7-tris(2,6-dipropylanilino)-8-fluoroquinizarin,
(245) 5,6,7-tris(2,6-diisopropylanilino)-8-fluoroquinizarin,
(246) 5,6,7-tris(2-chloro-6-methylanilino)-8-fluoroquinizarin,
(247) 5,6,7-tris(2,6-diethoxyanilino)-8-fluoroquinizarin;

S. Examples of the quinizarin compound having three secondary amino groups (anilino group and alkylamino group) at at least 6 position, and fluorine atoms at remaining positions:
(248) 5,6,7-tris(butylamino)-8-fluoroquinizarin,
(249) 5,6-bis(2,6-diisobutylpropylanilino)-7-butylamino-8-fluoroquinizarin,
(250) 5,6-bis(2,6-diisopropylanilino)-7-octylamino-8-fluoroquinizarin, (251) 5,6-bis(2,6-diethoxyanilino)-7-butylamino-8-fluoroquinizarin,
(252) 5,6-bis(2,6-diethoxyanilino)-7-octylamino-8-fluoroquinizarin;

T. Examples of the quinizarin compound having one secondary amino group (anilino group) at 6 position, and chlorine atoms at remaining positions:
(253) 6-(m-ethoxycarbonylanilino)-5,7,8-trichloroquinizarin,
(254) 6-(2,6-dimethylanilino)-5,7,8-trichloroquinizarin,
(255) 6-(2,6-diethylanilino)-5,7,8-trichloroquinizarin,
(256) 6-(2-methyl-6-carboxyanilino)-5,7,8-trichloroquinizarin,
(257) 6-(2,6-dichloroanilino)-5,7,8-trichloroquinizarin,
(258) 6-(2,6-diisopropylanilino)-5,7,8-trichloroquinizarin;

U. Examples of the quinizarin compound having one secondary amino group (anilino group) at 6 position, and alkoxy groups and chlorine atoms at remaining positions:
(259) 6-(m-ethoxycarbonylanilino)-7-octyloxy-5,8-dichloroquinizarin,
(260) 6-(p-butoxycarbonylanilino)-7-octyloxy-5,8-dichloroquinizarin,
(261) 6-(p-nitroanilino)-7-octyloxy-5,8-dichloroquinizarin,
(262) 6-(p-cyanoanilino)-7-octyloxy-5,8-dichloroquinizarin,
(263) 6-anilino-5(or 8),7-dibutoxy-8(or 5)-chloroquinizarin,
(264) 6-(m-ethoxycarbonylanilino)-5(or 8),7-dibutoxy-8(or 5)-chloroquinizarin,
(265) 6-(p-butoxycarbonylanilino)-5(or 8),7-dibutoxy-8(or 5)-chloroquinizarin,
(266) 6-(p-nitroanilino)-5(or 8),7-dibutoxy-8(or 5)-chloroquinizarin,
(267) 6-(p-cyanoanilino)-5(or 8),7-dibutoxy-8(or 5)-chloroquinizarin;

V. Examples of the quinizarin compound having two secondary amino groups (anilino groups) at at least 6 position, and chlorine atoms at remaining positions:
(268) 6,7-bis(2,6-diethylanilino)-5,8-dichloroquinizarin,
(269) 6,7-bis(2,6-diisopropylanilino)-5,8-dichloroquinizarin;

W. Examples of the quinizarin compound having two secondary amino groups (anilino groups) at at least 6 position, and alkoxy groups and chlorine atoms at remaining positions:
(270) 6,7-bis(m-ethoxycarbonylanilino)-5-octyloxy-8-chloroquinizarin,
(271) 6,7-bis(p-ethoxycarbonylanilino)-5-octyloxy-8-chloroquinizarin,
(272) 6,7-bis(2,6-diethylanilino)-5-butoxy-8-chloroquinizarin,
(273) 6,7-bis(2,6-diisopropylanilino)-5-butoxy-8-chloroquinizarin,
(274) 6,7-bis(2,6-diethyl-3-chloroanilino)-5-butoxy-8-chloroquinizarin,
(275) 6,7-bis(2,6-diethyl-3-chloroanilino)-5-octyloxy-8-chloroquinizarin,
(276) 6,7-bis(2-ethoxycarbony-6-methylanilino)-5-butoxy-8-chloroquinizarin,
(277) 6,7-bis(2-ethoxycarbony-6-methylanilino)-5-octyloxy-8-chloroquinizarin;

X. Examples of the quinizarin compound having two secondary amino groups (anilino group and alkylamino group) at at least 6 position, and alkoxy groups and chlorine atoms at remaining positions:
(278) 6-anilino-7-butylamino-8(or 5)-octyloxy-5(or 8)-chloroquinizarin,
(279) 6-(m-ethoxycarbonylanilino)-7-butylamino-5(or 8)-butoxy-8(or 5)-chloroquinizarin,
(280) 6-(p-ethoxycarbonylanilino)-7-butylamino-8(or 5)-octyloxy-5(or $^8$)-chloroquinizarin,
(281) 6-(m-ethoxycarbonylanilino)-7-butylamino-8(or 5)-octyloxy-5(or 8)-chloroquinizarin;

Y. Examples of the quinizarin compound having two secondary amino groups (anilino group and alkylamino group) at at least 6 position, and alkoxy groups and hydrogen atoms at remaining positions:
(282) 6-anilino-7-butylamino-8(or 5)-octyloxyquinizarin,
(283) 6-(m-ethoxycarbonylanilino)-7-butylamino-5(or 8)-butoxyquinizarin,
(284) 6-(p-ethoxycarbonylanilino)-7-butylamino-8(or 5)-octyloxyquinizarin,
(285) 6-(m-ethoxycarbonylanilino)-7-butylamino-8(or 5)-octyloxyquinizarin;

Z. Examples of the quinizarin compound having two secondary amino groups (anilino groups) at at least 6 position, and alkoxy groups and hydrogen atoms at remaining positions:
(286) 6,7-bis(m-ethoxycarbonylanilino)-5-octyloxyquinizarin,
(287) 6,7-bis(p-ethoxycarbonylanilino)-5-octyloxyquinizarin,
(288) 6,7-bis(2,6-diethylanilino)-5-butoxyquinizarin,
(289) 6,7-bis(2,6-diisopropylanilino)-5-butoxyquinizarin,
(290) 6,7-bis(2,6-diethy-3-chloroanilino)-5-butoxyquinizarin,
(291) 6,7-bis(2,6-diethyl-3-chloroanilino)-5-octyloxyquinizarin,
(292) 6,7-bis(2-ethoxycarbonyl-6-methylanilino)-5-butoxyquinizarin,
(293) 6,7-bis(2-ethoxycarbonyl-6-methylanilino)-5-octyloxyquinizarin,
(294) 6,7-bis(2,6-diethylanilino)quinizarin,
(295) 6,7-bis(2,6-diisopropylanilino)quinizarin;

[1] Examples of the quinizarin compound having two phenylthio groups and one amino group, and fluorine atoms at remaining positions:
(296) 5-amino-6,7-diphenylthio-8-fluoroquinizarin;

[2] Examples of the quinizarin compound having two phenylthio groups at 6 and 7 positions, and two anilino groups at remaining positions:
(297) 5,8-dianilino-6,7-diphenylthioquinizarin;

[3] Examples of the quinizarin compound having two phenylthio groups, and fluorine atoms at remaining positions:
(298) 6,7-diphenylthio-5,8-difluoroquinizarin,
(299) 6,7-bis(4-carboxy-2,3,5,6-tetrafluorophenylthio)-5,8-difluoroquinizarin,
(300) 6,7-bis(4-cyano-2,3,5,6-tetrafluorophenylthio)-5,8-difluoroquinizarin,
(301) 6,7-bis(p-hydroxyphenylthio)-5,8-difluoroquinizarin,
(302) 6,7-bis(p-methoxyphenylthio)-5,8-difluoroquinizarin;

[4] Examples of the quinizarin compound having two alkylthio groups, and fluorine atoms at remaining positions:
(303) 6,7-dihexylthio-5,8-difluoroquinizarin,
(304) 6,7-dioctylthio-5,8-difluoroquinizarin,
(305) 6,7-ditertiary butylthio-5,8-difluoroquinizarin,
(306) 6,7-dicyclohexylthio-5,8-difluoroquinizarin;

[5] Examples of the quinizarin compound having four phenylthio groups:
(307) 5,6,7,8-tetraphenylthioquinizarin;

[6] Examples of the quinizarin compound having four alkylthio groups:
(308) 5,6,7,8-tetrabutylthioquinizarin;

21

[7] Examples of the quinizarin compound having two phenylthio groups and one amino group, and chlorine atoms at remaining positions:
(309) 5-amino-6,7-diphenylthio-8-chloroquinizarin;

[8] Examples of the quinizarin compound having two phenylthio groups, and chlorine atoms at remaining positions:
(310) 6,7-diphenylthio-5,8-dichloroquinizarin,
(311) 6,7-bis(4-carboxy-2,3,5,6-tetrafluorophenylthio)-5,8-dichloroquinizarin,
(312) 6,7-bis(4-cyano-2,3,5,6-tetrafluorophenylthio)-5,8-dichloroquinizarin,
(313) 6,7-bis(p-hydroxyphenylthio)-5,8-dichloroquinizarin,
(314) 6,7-bis(p-methoxyphenylthio)-5,8-dichloroquinizarin;

[9] Examples of the quinizarin compound having two alkylthio groups, and chlorine atoms at remaining positions:
(315) 6,7-dihexylthio-5,8-dichloroquinizarin,
(316) 6,7-dioctylthio-5,8-dichloroquinizarin,
(317) 6,7-ditertiary butylthio-5,8-dichloroquinizarin,
(318) 6,7-dicyclohexylthio-5,8-dichloroquinizarin;

[10] Examples of the quinizarin compound having two phenylthio groups and one amino group, and hydrogen atoms at remaining positions:
(319) 5-amino-6,7-diphenylthioquinizarin;

[11] Examples of the quinizarin compound having two phenylthio groups, and hydrogen atoms at remaining positions:
(320) 6,7-diphenylthioquinizarin,
(321) 6,7-bis(4-carboxy-2,3,5,6-tetrafluorophenylthio) quinizarin,
(322) 6,7-bis(4-cyano-2,3,5,6-tetrafluorophenylthio) quinizarin,
(323) 6,7-bis(p-hydroxyphenylthio)-5,8-quinizarin,
(324) 6,7-bis(p-methoxyphenylthio)-5,8-quinizarin;

[12] Examples of the quinizarin compound having two alkylthio groups, and hydrogen atoms at remaining positions:
(325) 6,7-dihexylthioquinizarin,
(326) 6,7-dioctylthioquinizarin,
(327) 6,7-ditertiary butylthioquinizarin,
(328) 6,7-dicyclohexylthioquinizarin.

The novel quinizarin compound of this invention can be produced by the two methods described above, for example. One of the methods of production comprises preparing as a starting material a quinizarin having the 5, 6, 7 and 8 positions, or the 5, 6 and 7 positions, or the 5, 6 and 8 positions, or the 5 and 6 positions, or the 5 and 7 positions, or the 6 and 7 positions, or the 6 position, or the 7 position thereof substituted with halogen atoms as represented by the following general formula (4):

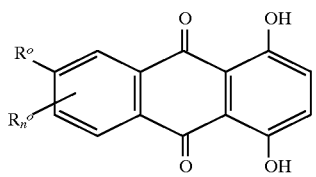

(wherein $R^0$ stands for a halogen atom and n is an integer in the range of 0 to 3)
and causing one or a plurality of nucleophilic substances selected from among aromatic amino compounds, ammonia, aliphatic amino compounds, aromatic hydroxy compounds, aliphatic hydroxy compounds, water, aromatic mercapto compounds, and aliphatic mercapto compounds respectively to react independently or sequentially or simultaneously with the quinizarin thereby inducing nucleophilic substitution of the halogen atom.

In the nucleophilic substances mentioned above, the primary amine compounds are aniline compounds which are represented by the general formula (5):

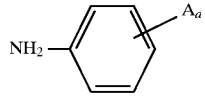

wherein A independently stands for at least one member selected from the class consisting of —$COOR^1$ (wherein $R^1$ stands for a hydrogen atom or an alkyl group of 1 to 18, preferably 1 to 12, carbon atoms), sulfonic group, cyano group, alkyl groups of 1 to 8, preferably 1 to 6, carbon atoms, alkoxy groups of 1 to 8, preferably 1 to 6 carbon atoms, and halogen atoms, and a is an integer in the range of 0 to 5, preferably 1 to 3. In this case, the aniline compound is desired to have the 2 and 6 positions thereof both substituted. As another example of the primary amine compound, $NHR^2$ (wherein $R^2$ stands for a hydrogen atom or an alkyl group of 1 to 18, preferably 1 to 12, carbon atoms) may be cited.

The reaction in this case is generally carried out in an organic solvent. The organic solvents which are effectively usable for this reaction include, for example, such inert solvents as nitrobenzene, acetonitrile, and benzonitrile, such nonprotonic polar solvents as pyridine, N,N-dimethyl acetamide, N-methyl-2-pyrrolidone, triethyl amine, tri-n-butyl amine, dimethyl sulfone, and sulforan, such halogen type solvents as α-chloronephthalene, trichlorobenzene, dichlorobenzene, chloroform, and dichloroethane, and benzene, toluene, and xylene. It is permissible to use the aforementioned nucleophilic substances like amino compounds, hydroxy compounds and water by themselves or an aqueous ammonia solution as a solvent in the reaction without using such an organic solvent as mentioned above.

As a condensation agent, it is advantageous to use such an organic base as triethyl amine or tri-n-butyl amine or an inorganic salt such as potassium fluoride, potassium hydroxide, potassium carbonate, sodium hydroxide, or sodium carbonate. When the nucleophilic substance itself manifests the nature as a condensation agent in such amino compounds as aniline, toluidine, anisidine, n-butyl amine, and n-octyl amine, the use of the condensation agent is not always found necessary. Alternatively, when the nucleophilic substance itself has a high reactivity, a condensation agent is not always necessary to use. The reaction temperature is in the range of 20° to 200° C., though variable as with the kind of reaction solvent. The substitution reaction of an aromatic amino compound is desired to be carried out at a temperature in the range of 50° to 180° C., that of ammonia or an aliphatic amino compound in the range of 20° to 100° C., that of an aromatic hydroxy compound in the range of 20° to 120° C., that of a hydroxy compound or an aliphatic hydroxy compound in the range of 50° to 180° C., that of an aromatic mercapto compound in the range of 20° to 100° C., and that of an aliphatic mercapto compound in the range of 50° to 180° C.

Incidentally, the quinizarin which has the 5, 6, 7, and 8 positions, or the 5, 6 and 7 positions, or the 5, 6 and 8 positions, or the 5 and 6 positions, or the 5 and 7 positions, or the 6 and 7 positions, or the 6 position, or the 7 position thereof substituted with halogen atoms and is used as a starting material in the method under consideration can be synthesized, for example, by such a well-known reaction as a Friedel-Crafts reaction from phthalic anhydride or phthalic acid (preferably, phthalic anhydride) which has the 3, 4, 5 and 6 positions, or the 3, 4 and 5 positions, or the 3, 4 and 6 positions, or the 3 and 4 positions, or the 4 and 5 positions, or the 3 and 5 positions, or the 4 position, or the 5 position thereof substituted with hologen atoms, and hydroquinone or dimethoxy hydroquinones (preferably, dimethoxy hydroquinone), for example, using as an acylating agent anhydrous aluminum chloride, for example. When the halogens at the 5, 6, 7, and 8 positions are fluorine atoms, the quinizarin can be synthesized by the method introduced to the art by the present inventors (disclosed in JP-A-61-112, 041 and described in Japanese Appplication No. 05-261, 293). When the halogens are other than fluorine atoms, the synthesis can be carried out similar to that with fluorine atoms.

The other method of production comprises causing a phthalic anhydride derivative the phthalic anhydride structure of which has one to four of the 3, 4, 5 and 6 positions and at least either the 4 or 5 position thereof formed of at least one member selected from the class consisting of secondary amino groups, alkylthio groups, and optionally substituted phenylthio groups, and the remaining positions thereof formed of at least one member selected from the class consisting of hydrogen atom, halogen atoms, amino group, hydroxy group, alkoxy groups, and optionally substituted phenoxy groups to react with hydroquinone or 1,4-dimethoxy benzene.

To be specific, this method produces the quinizarin compound by causing a phthalic anhydride derivative represented by the general formula (6):

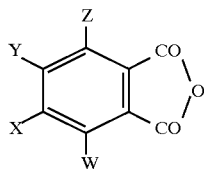

(6)

wherein one to four of the W, X, Y, and Z positions and at least either of X or Y position are formed of at least one member selected from the class consisting of secondary amino groups, alkylthio groups, and optionally substituted phenylthio groups and the remaining positions are formed of at least one member selected from the class consisting of hydrogen atom, halogen atoms, amino group, hydroxy group, alkoxy groups, and optionally substituted phenoxy groups to react with hydroquinone or 1,4-dimethoxy benzene.

The derivative of phthalic anhydride or phthalic acid having the benzene ring of phthalic anhydride partly or wholly substituted by a compound selected from among halogen atoms, aromatic amino compounds, ammonia, aliphatic amino compounds, aromatic hydroxy compounds, aliphatic hydroxy compounds, water, aromatic mercapto compounds, and aliphatic mercapto compounds is produced by causing one or a plurality of nucleophilic substances selected from among aromatic amino compounds, aliphatic amino compounds, aromatic hydroxy compounds, aliphatic hydroxy compounds, aromatic mercapto compounds, and aliphatic mercapto compounds respectively to react independently or sequentially or simultaneously with a halogenated phthalic anhydride or a halogenated phthalic acid such as, for example, tetrachlorophthalic anhydride, tetrafluorophthalic anhydride, and tetrafluorophthalic acid thereby inducing nucleophilic substitution of the halogen atom.

The reaction temperature is in the range of 20° to 200° C., though variable as with the kind of reaction solvent. The substitution reaction of an aromatic amino compound is desired to be carried out at a temperature in the range of 50° to 180° C., that of ammonia or an aliphatic amino compound in the range of 20° to 100° C., that of an aromatic hydroxy compound in the range of 20° to 120° C., that of a hydroxy compound or an aliphatic hydroxy compound in the range of 50° to 180° C., that of an aromatic mercapto compound in the range of 20° to 100° C., and that of an aliphatic mercapto compound in the range of 50° to 180° C. The reaction in this case is generally carried out in an organic solvent. The organic solvents which are effectively usable for this reaction include, for example, such inert solvents as nitrobenzene, acetonitrile, and benzonitrile, such nonprotonic polar solvents as pyridine, N,N-dimethyl acetamide, N-methyl-2-pyrrolidone, triethyl amine, tri-n-butyl amine, dimethyl sulfone, and sulforan, such halogen type solvents as α-chloronephthalene, trichlorobenzene, dichlorobenzene, chloroform, and dichloroethane, and benzene, toluene, and xylene. It is permissible to use the aforementioned nucleophilic substances like amino compounds, hydroxy compounds or water by themselves or an ammonia solution as a solvent in the reaction without using such an organic solvent as mentioned above.

As a condensation agent, it is advantageous to use such an organic base as triethyl amine or tri-n-butyl amine or an inorganic base such as potassium fluoride, potassium hydroxide, potassium carbonate, sodium hydroxide, or sodium carbonate. When the nucleophilic substance itself manifests the nature as a condensation agent in such amino compounds as aniline, toluidine, anisidine, n-butyl amine, and n-octyl amine, the use of the condensation agent is not always found necessary. The condensation agent is not always found necessary when the nucleophilic substance itself possesses strong reactivity.

The derivative of phthalic anhydride or phthalic acid having the benzene ring of phthalic anhydride substituted partly or wholly by a compound selected from among halogen atoms, aromatic amino compounds, ammonia, aliphatic amino compounds, aromatic hydroxy compounds, aliphatic hydroxy compounds, water, aromatic mercapto compounds, and aliphatic mercapto compounds can be obtained by hydrolyzing in accordance with the generally adopted method the phthalonitrile having the benzene ring of phthalonitrile partly or wholly substituted preparatorily by a halogen atom, an aromatic amino compound, ammonia, an aliphatic amino compound, an aromatic hydroxy compound, an aliphatic hydroxy compound, water, an aromatic mercapto compound, or an aliphatic mercapto compound in accordance with the method taught by Ishikawa et al., in the Journal of Organic Synthesis Society, Vol. 21, No. 8, page 792 (1971) or the method disclosed by the present inventors in Japanese Patent Applicatoin No. 04-28,185, for example.

When the quinizarin compound mentioned above has one secondary amino group, it is useful as a magenta dye. When this quinizarin compound has two secondary amino groups, it is useful as a cyan dye.

This invention is further directed to an electrophotographic grade color toner composition which comprises at least one coloring agent selected from the group consisting of the magenta dye and the cyan dye and a binder resin.

As the binder resin in the color toner of this invention, any of the binder resins heretofore known to the art may be used. Concrete examples of the well-known binder resins include styrene and derivatives thereof such as polystyrene, polyvinyl toluene, poly-α-methylstyrene, poly-p-chlorostyrene, and aminostyrene, styrene type copolymers such as styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-α-chloromethyl methacrylate copolymer, styrene-acrylonitrile copolymer, styrene-vinyl methyl ether copolymer, styrene-butadiene copolymer, styrene-isoprene copolymer, styrene-acrylonitrile-indene copolymer, styrene-maleic acid copolymer, and styrene-maleic ester copolymers, homopolymers and copolymers of methacrylic acid and methacrylate esters such as methyl methacrylate, ethyl methacrylate, and butyl methacrylate, homopolymers and copolymers of acrylic acid and acrylic esters such as methyl acrylate, ethyl acrylate, butyl acrylate, and 2-ethylhexyl acrylate, dienes such as butadiene and isoprene, homopolymers of vinyl monomers such as acrylonitrile, vinyl ethers, maleic acid and maleic esters, maleic anhydride, vinyl chloride, and vinyl acetate and copolymers of the vinyl type monomers mentioned above with other monomers, homopolymers and copolymers of olefin type compounds such as ethylene and propylene, polyesters, polyamides, polyurethanes, rosin, modified rosins, terpene resins, phenol resins, aliphatic and alicyclic hydrocarbon resins, aromatic petroleum resins, chlorinated paraffins, and paraffin waxes. These binder resins can be used either singly or in the form of a mixture of two or more members.

The electrification constitutes one of the important qualities of a toner. The control of this electrification of the toner may be effected with the resin or the coloring agent by itself. Otherwise, it may be attained by the addition of such an antistatic agent as is incapable of affecting the color tone. Any of the well-known antistatic agents can be adopted for use in the color toner of this invention. Concrete examples of the well-known antistatic agents which are usable herein include metal complexes of salicylic acid, organic salts of boron, quaternary ammonium salts, aluminum compounds, silicone derivatives, zinc compounds, metal complexes of imidazole, and pyridinium salts.

The amount of the antistatic agent to be added properly is in the range of 0.05 to 15 parts by weight, preferably 0.1 to 10 parts by weight, based on the amount of the binder resin. The use of the antistatic agent herein may be attained by having the agent added to and mixed with the binder resin. It may be otherwise accomplished by having the agent deposited on the surface of toner particles by a varying method available for the deposition.

Besides, the color toner of this invention may incorporate therein a solid electrolyte, a macromolecular electrolyte, a charge transfer complex, a conductor such as tin oxide or other similar metal oxide, a semiconductor, a ferroelectric substance, or a magnetic substance for the purpose of controlling the electric characteristics of the toner. It may also incorporate therein such additives as varying plasticizers and mold release agents for the purpose of controlling various physical properties such as thermal properties. Further, it may incorporate therein such minute inorganic particles as fine powders of $TiO_2$, $Al_2O_3$, and $SiO_2$ and colloidal silica or such minute organic particles as fine resin powders for the purpose of imparting improved flowability and enhanced resistance to coagulation to the toner.

For the production of the color toner of this invention, any of the methods generally adopted heretofore and various other methods may be adopted. For example, the common method which produces a color toner by uniformly mixing a resin, a coloring agent, and optionally various additives by the use of a varying mixer such as a ball mill, then melting and kneading the resultant mixture by the use of a pressure kneader, an extruder, or a roll mill, subsequently coarsely pulverizing the produced blend as with a hammer mill, further finely pulverizing the coarse lumps as with an air jet type fine pulverizer, and classifying the resultant powder and separating a fine powder may be adopted. Otherwise, the method which produces a color toner by polymerizing a polymeric monomer by such an operation as emulsion polymerization, suspension polymerization, dispersion polymerization, or seed polymerization in the presence of a coloring agent thereby forming a fine powder of colored resin having a prescribed average particle diameter may be adopted. Alternatively, the method which produces a color toner by preparatorily synthesizing a fine powder of resin having a prescribed average particle diameter by the same technique of pulverization and classification as adopted in the ordinary production of a toner or polymerizing a polymeric monomer by such an operation as emulsion polymerization, suspension polymerization, dispersion polymerization, or seed polymerization and coloring or dyeing the powder with a coloring agent may be adopted.

The ratio of the amount of the binder resin to that of the dye mentioned above is in the range of 0.1 to 10 parts by weight, preferably 1 to 6 parts by weight, of the dye to 100 parts by weight of the binder resin.

The color toner of this invention can be mixed with a carrier to give rise to an electrophotographic developer. The carriers which can be effectively used in this case include, for example, such well-known carriers as iron powder, nickel powder, glass beads, and ferrite powder and further include, for example, those which are obtained by coating the surface of such well-known carriers with styrene-acrylic ester copolymers, styrene-methacrylate ester copolymers, acrylic ester polymers, methacrylate ester polymers, silicone resins, polyamide resins, ionomer resins, polyphenylene, sulfide resins, or mixtures thereof.

This invention is further directed to a thermal-transfer recording sheet which is provided on a substrate with a coloring material layer containing at least one dye selected from the group consisting of the magenta dye and the cyan dye both mentioned above.

The transfer sheet using the dye of this invention is produced by preparing a thermal-transfer recording ink composed of a dye, a binder resin, and a solvent, applying the ink on a transfer sheet substrate, and drying the wet applied layer of the ink. The concentration of the dye in the ink is generally in the range of 1 to 5% by weight.

The binder resin to be used for the preparation of the ink may be any of the binder resins heretofore well known in the art. Concrete examples of the binder resins which are advantageously used herein include such cellulose type resins as ethyl cellulose, hydroxyethyl cellulose, ethyl hydroxy cellulose, hydroxypropyl cellulose, methyl cellulose, and cellulose acetate and such vinyl type resins as polyvinyl butyral, polyvinyl acetoacetal, polyvinyl pyrrolidone, and polyacrylamide. Among other binder resins cited above, polyvinyl butyral proves to be particularly desirable from the standpoints of resistance to heat and ease of transfer of dye.

The media which are advantageously usable for the preparation of the ink include, for example, such aromatic compounds as toluene, xylene, and chlorobenzene, such esters as ethyl acetate and butyl acetate, such ketones as acetone, methylethyl ketone, methyl isobutyl ketone, and cyclohexanone, such alcohols as methanol, ethanol, propanol, and butanol, such cellosolves as methyl cellosolve and ethyl cellosolve, and such hydrocarbons as ligroine, cyclohexane, and kerosene.

As the base material for the transfer sheet to which the ink is applied, any of the heretofore well-known materials which excel in resistance to heat and strength may be used. Concrete examples of the base materials advantageously used herein include polyester film, polystyrene film, polypropylene film, polysulfone film, polycarbonate film, Alamides film, polyvinyl alcohol film, and cellophane. Among other base materials cited above, polyester film proves to be particularly desirable. The thickness of the base material properly used herein is in the range of 2 to 20 $\mu$m, preferably 3 to 10 $\mu$m.

The application of the ink to the base material of the transfer sheet can be effected by the use of a bar coater, a roll coater, a gravure coater, or a knife coater. The thickness of the applied layer of the ink after drying is desired to be in range of 0.1 to 5 $\mu$m, preferably 0.4 to 2.0 $\mu$m.

The recording materials on which the transfer sheet is used effectively include, for example, polyolefin type resins such as polyethylene and polypropylene; halogen type polymers such as polyvinyl chloride and polyvinylidene chloride; vinyl type polymers such as polyvinyl alcohol, polyvinyl acetate, and polyacrylic acid; polyester type resins such as polyethylene terepthalate and polybutylene terephthalate; polystyrene resin, polyamide resin, resins of the copolymers of such olefins as ethylene and propylene with other vinyl polymers; cellulose type resins such as ionomer and cellulose diacetate; and fibers, woven fabrics, films, sheets, and formed articles made of polycarbonate, polysulfone, and polyimide.

Among other recording materials cited above, fibers, woven fabrics, films, sheets, and processed papers made of polypropylene or polyethylene terephthalate prove to be particularly desirable.

Further, this invention is directed to an optical recording medium which contains the aforementioned quinizarin compound in the recording layer formed on the substrate.

This invention is also directed to a tracing type optical recording medium adapted for a compact disk and composed of a transparent resinous substrate, a recording layer formed on the substrate, and a metallic reflecting layer, which optical recording medium has the aforementioned quinizarin compound contained in the recording layer mentioned above.

The substrate of the disk to be used in this case is desired to be pervious to the light which is used for recording a signal or reading the recorded signal. The transmittance of this substrate relative to light is desired to be not less than 85% and the optical anisotropy is desired to be as small as possible. Concrete examples of the disk substrates desirably used herein include substrates which are made of glass, acrylic resin, polycarbonate resin, polyester resin, polyamide resin, vinyl chloride resin, polystyrene resin, and epoxy resin. Among other substrates cited above, those made of polycarbonate resin prove to be particularly desirable from the standpoints of optical characteristics, ease of forming, and mechanical strength.

The dye mentioned above is first deposited in the form of a layer on the substrate and the metallic reflecting film layer is formed thereon. The metals which are usable for the reflecting layer include, for example, Al, Ag, Au, Cu, and Pt, for example. This reflecting layer is generally formed by vacuum deposition or spattering.

For the formation of the recording layer containing the dye on the substrate in the optical recording medium of this invention, it is generally desirable to use the method of coating. This coating is accomplished by such an operation as spin coating, dip coating, or roll coating. Among other coating operations mentioned above, the spin coating operation proves to be particularly desirable. The organic solvent to be used in the coating operation ought to avoid corroding the substrate. Concrete examples of the organic solvents which are usable advantageously herein include aliphatic and alicyclic hydrocarbons such as hexane, octane, and cyclohexane and alcohol type solvents such as methyl alcohol, isopropyl alcohol, allyl alcohol, methyl cellosolve, and ethyl cellosolve. Since the aforementioned dyes of this invention exhibit particularly high solubility in alcohol type solvents, it is desirable to use these solvents in the coating operation under consideration.

The CD of this invention, in view of the interchangeability of players, is required to exhibit a reflectance of not less than 60% relative to the laser beam passed through the substrate and used for reading. The adjustment of the reflectance is attained by optimizing the film thicknesses of the relevant dyes being used in the CD. Generally, these film thicknesses are desired to be in the range of 50 nm to 300 nm.

Further, this invention is directed to an ink jet grade ink composition which comprises at least one dye selected from the group consisting of the magenta dye and the cyan dye both mentioned above and a vehicle.

The ink jet recording is known in various types such as continuous injection type, intermittent injection type, on-demand type, and ink mist type, depending on the kind of system. The ink jet grade ink is also known in numerous types such as water type, water-solvent type, solvent type, and solid type. The ink of the water type is generally predominant. Particularly, the ink of the solid type is normally in a solid or semi-solid state at a normal temperature. The recording with this ink is attained by a procedure which comprises heating this solid ink with an ink jet device, spouting the liquefied ink through the ink jet device, causing the hot ink liquid to land on a given surface, and allowing the deposited dots of ink liquid to cool and solidify. The ink of the solid type can produce prints on various materials ranging from the OHP film to the tissue paper and is characterized by producing prints of ideal contrast. Though the solid ink has the prospect of bright future, none of the pigments or dyes heretofore available for the solid ink satisfies the two aspects of lightfastness and color tone simultaneously.

The dye of this invention exhibits high solubility in solvents, enjoys very high lightfastness, and excels in color tone. Thus, it manifests an outstanding effect in any of the types of ink mentioned above. Among other types cited above, this dye proves to be suitable for the solvent type ink and the solid or semi-solid type ink, especially for the solid or semi-solid type ink.

The dye of this invention can be used as a coloring agent for the ink of the new system which, as disclosed in Fine Chemical, 1991, Vol. 20, No. 21, page 15, utilizes the electroviscous effect of ink as in the operation of effecting the ink jet recording by dispersing polymer particles in an insulating medium, causing change of the viscosity of the resultant dispersion by the application of an electric field, and controlling the discharge of the ink.

The vehicles which are effectively usable for the dry oil type ink in this invention include, for example, a rosin-modified phenol resin, a petroleum type resin, or an alkyd resin as the resin component, and linseed oil, tung oil, or synthetic dry oil as the dry oil component, and a petroleum type solvent as the solvent component. The vehicles effectively usable for the organic solvent type ink include, for example, a polyamide resin, a vinyl type nitrocellulose resin, or an acryl type resin as the resin component and toluene, an ester type solvent, a ketone type solvent, or an alcohol type solvent as the solvent component. The vehicles effectively usable for the water type or water-solvent type ink include a maleic acid type resin or an acrylic type resin as the resin component and water, an alcohol type solvent, or a glycol type solvent for the solvent component. The vehicles effectively usable for the solid or semi-solid type ink include the composition obtained by combining a fatty acid such as oleic acid with a wax as an additive, the composition obtained by combining a fatty acid such as oleic acid as a vehicle containing benzyl ether with a wax as an additive, or the composition having a wax as a main component.

The wax to be used as a vehicle component in the solid or semi-solid type ink may be any of the waxes heretofore well known in the art. Concrete examples of the well-known waxes include sumac wax, candelilla wax, carnauba wax, microcrystalline wax, paraffin wax, Fischer-Tropsch wax, polyolefin wax, various low molecular weight polyethylenes, beeswax, spermaceti wax, ibotallow, wool wax, ceramic wax, candellila wax, petrolactam, fatty acid ester waxes, fatty acid amide waxes, polymers of long-chain acrylate or long-chain methacrylate such as long-chain acrylates (such as, for example, stearyl acrylate and behenyl acrylate) or long-chain methacrylates (such as, for example, stearyl methacrylate and behenyl methacrylate), acryl or methacryl copolymers containing such long-chain acrylates or long-chain methacrylates as mentioned above, and waxes obtained from acryl or methacryl copolymers with monomers having other vinyl groups. These waxes can be used either singly or in the form of a mixture of two or more members. Further, they may be combined in a suitable ratio as by graft polymerization.

The amount of the wax to be used is in the range of 0.5 to 99.0% by weight, based on the amount of the ink composition. The amount of the dye to be used is in the range of 0.5 to 10% by weight, preferably 1.0 to 5.0% by weight, based on the amount of the ink composition.

This invention is further directed to a color filter which contains at least one dye selected from the class consisting of quinizarin compounds according to this invention in a filter substrate.

The following methods are available for the production of the color filter of this invention.

(1) The method which produces a color filter by causing the dye of this invention, either alone or in combination with other dye, to be mixed with 1 to 100 parts by weight per part by weight of the dye of a thermoplastic resin such as polystyrene, polymethyl methacrylate, polycarbonate, polyester, or polyvinyl chloride and forming the resultant mixture by such an operation as injection molding or elongation.

(2) The method which comprises causing the dye of this invention, either alone or in combination with other dye, to be solved together with 1 to 100 parts by weight per part by weight of the dye of such a binder as polystyrene, polymethyl methacrylate, or polycarbonate in a solvent, and forming a film of the resultant solution as by casting or spin coating or forming a substrate of the solution as by vacuum deposition.

(3) The method which comprises causing the dye of this invention, either alone or in combination with other dye, to be preparatorily solved in 1 to 100 parts by weight per part by weight of the dye of a light sensitive resin, forming a film of the resultant solution as by casting or spin coating on a substrate, and patterning the formed film as by irradiation of light.

In the method of (3) mentioned above, the patterning of the dye layer can be carried out on an optically transparent substrate. The substrate thus used has no particular restriction except for the requirement that it should allow the dye layer to be patterned as required and ensure production of a color filter possessed of a prescribed function. Concrete examples of the substrates effectively usable herein include glass sheet and films or sheets of such resins as polyvinyl alcohol, hydroxyethyl cellulose, methyl methacrylate, polyester, butyral, polyamide, polyethylene, vinyl chloride, vinylidene chloride, polycarbonate, polyolefin copolymer resins, vinyl chloride copolymer resins, vinylidene chloride copolymer resins, and styrene copolymer resins. The patterned dye layer may be integrally formed with what is intended to be utilized as a color filter.

In the method for the production of the color filter of this invention, the light sensitive resist grade resin to be used in combination with the dye of this invention as described above is only required to be capable of being solidified with light or to be a photo-setting resin. It may be any of the resins containing light sensitive groups which have won wide recognition through introduction in various pieces of literature ("Recording Materials and Light Sensitive Resins," compiled by the Japan Society for the Promotion of Science and published by Gakkai Shuppan Center and "Photopolymer Handbook," compiled by Photopolymer Meeting and published by Kogyo Chosakai).

Concrete examples of the light sensitive resist grade resins include as following:

(a) Water-soluble photosensitive resins having a photosensitive group, such as a polyvinyl alcohol resin having a stilbazolium group, (b) Oil-soluble photosensitive resins having a photosensitive group, such as a cinnamate type photo-crosslinkable photosensitive resin, a bisazide type photo-decomposing cross-linkable photosensitive resin, and an o-quinoneazide type decomposing polar modified photosensitive resin, (c) Resin composition containing a photo-crosslinkable resin and a photo-crosslinking agent:

(c1) Photo-crosslinkable resins including such animal protein resins as gelatin, casein and glue, such cellulose type resins as carboxymethylcellulose and hydroxyethyl cellulose, vinyl polymerization type resins of polyvinyl alcohol, polyvinyl pyrrolidone, polyvinyl methylether, polyacrylic acid and polyacrylamide and copolymers thereof, such ring opening polymerization type resins as polyethylene glycol and polyethylene imine, condensation resins such as water-soluble nylon, such oil-soluble resins as butyral resin, styrene-maleic acid copolymers, chlorinated polyethylene, chlorinated polypropylene, polyvinyl chloride, vinyl chloride, vinyl acetate copolymers, polyvinyl acetate, acrylic resin, polyester, phenolic resin and polyurethane, (c2) Examples of the photo-crosslinking agent; dichromates, chromates, diazo compounds, and bisazide compounds, (d) Resin composition comprising a photo-crosslinkable resin, a polymerizable monomer and an initiator, (d1) Polymerizable monomers such as (meth)acrylic acid, 2-hydroxyethyl (meth)acrylate, 2-hydroxypropyl (meth)acrylate, vinyl acetate, N-vinyl pyrrolidone, (meth)acrylamide, N-hydroxymethyl (meth)acrylamide, polyethylene glycol di(meth)acrylate, methylenebis(meth) acrylamide, styrene, and (meth)acrylonitrile, (d2) Initiators including photo-decomposition type initiators such as azobisisobutyronitrile and benzoisoalkylether, hydrogen transfer type initiators such as benzophenone, anthraquinone and 2-phenylacridine, and electron transfer type condensation initiators such as benzanthrone/triethanolamine, methylene blue/benzenesulfinic acid salt and carbon tetrachloride/manganese carbonyl.

Among other resist resins known to the art, those resist resins which contain acrylic resins and epoxy type resins prove to be particularly desirable.

Now, this invention will be described more specifically below with reference to working examples.

The physicochemical properties of the compounds produced in the working examples are shown in the following tables. In these tables, the solubility is rated on the three-point scale, wherein Δ stands for a solubility of less than 1% by weight, ○ for a solubility in the approximate range of 1 to 3% by weight, and ◎ for a solubility of not less than 3% by weight.

EXAMPLES 1 AND 2

In a four-neck flask of 500 cc in inner volume, 400 cc of acetonitrile, 3 g (9.61 mmols) of 5,6,7,8-tetrafluoroquinizarin, about 1.8 g (19.3 mmols) of aniline, and 1.34 g (23.1 mmols) of potassium fluoride were placed and refluxed for reaction for about 24 hours. After the reaction, the reaction solution was filtered to separate potassium fluoride, distilled to expel acetonitrile, then poured into an aqueous hydrochloric acid solution to allow separation by filtration of solids formed by the reaction. The solids were washed with water and dried to obtain 4.3 g of a crude product. This crude product was refined by means of a column packed with silica gel (Wakogel C-200) to obtain 1.23 g of 6-anilino-5,7,8-trifluoroquinizarin [dye (1)] (yield 33.2 mol %) and 0.41 g of 6,7-dianilino-5,8-difluoroquinizarin [dye (120)] (yield 9.3 mol %). The physical properties of the dye (1) and the analyses used for the identification of this compound are shown in Table 1 and the physical properties of the dye (120) and the analyses used for the identification of this compound in Table 3.

EXAMPLES 3 AND 4

By following the procedures of Examples 1 and 2 while using about 3.7 g (19.1 mmols) of o-aminobenzoic acid-n-butyl in place of aniline, 1.47 g of 6-(o-butoxycarbonylanilino)-5,7,8-trifluoroquinizarin [dye (5)] (yield 31.5 mol %) and 0.65 g of 6,7-bis(o-butoxycarbonylanilino)-5,8-difluoroquinizarin [dye (122)] (yield 10.3 mol %) were obtained. The physical properties of the dye (5) and the analyses used for the identification of this compound are shown in Table 1 and the physical properties of the dye (122) and the analyses used for the identification of this compound in Table 3.

EXAMPLES 5 AND 6

By following the procedures of Examples 1 and 2 while using about 3.2 g (19.4 mmols) of m-aminoethyl benzoate in place of aniline, 1.42 g of 6-(m-ethoxycarbonylanilino)-5,7,8-trifluoroquinizarin [dye (4)] (yield 32.3 mol %) and 0.56 g of 6,7-bis(m-ethoxycarbonylanilino)-5,8-difluoroquinizarin [dye (121)] (yield 9.7 mol %) were obtained. The physical properties of the dye (4) and the analyses used for the identification of this compound are shown in Table 1 and the physical properties of the dye (121) and the analyses used for the identification of this compound in Table 3.

EXAMPLE 7

By following the procedures of Examples 1 and 2 while using about 4.8 g (19.3 mmols) of m-aminobenzoic acid-n-octyl in place of aniline, 1.48 g of 6-(m-octyloxycarbonylanilino)-5,7,8-trifluoroquinizarin [dye (8)] (yield 28.4 mol %) was obtained. The physical properties of this dye and the analyses used for the identification of this compound are shown in Table 1.

EXAMPLE 8

By following the procedures of Examples 1 and 2 while using about 3.7 g (19.1 mmols) of p-aminobenzoic acid-n-butyl in place of aniline, 1.53 g of 6-(p-butoxycarbonylanilino)-5,7,8-trifluoroquinizarin [dye (6)] (yield 32.8 mol %) was obtained. The physical properties of this dye and the analyses used for the identification of this compound are shown in Table 1.

EXAMPLES 9 AND 10

By following the procedures of Examples 1 and 2 while using about 2.4 g (19.5 mmols) of o-anisidine in place of aniline, 1.34 g of 6-(o-methoxyanilino)-5,7,8-trifluoroquinizarin [dye (14)] (yield 33.6 mol%) and 0.40 g of 6,7-bis(o-methoxyanilino)-5,8-difluoroquinizarin [dye (131)] (yield 8.0 mol%) were obtained. The physical properties of the dye (14) and the analyses used for the identification of this compound are shown in Table 2 and the physical properties of the dye (131) and the analyses used for the identification of this compound in Table 4.

EXAMPLES 11 AND 12

By following the procedures of Examples 1 and 2 while using about 2.4 g (19.5 mmols) of m-anisidine in place of aniline, 1.21 g of 6-(m-methoxyanilino)-5,7,8-trifluoroquinizarin [dye (16)] (yield 30.3 mol%) and 0.54 g of 6,7-bis(m-methoxyanilino)-5,8-difluoroquinizarin [dye (133)] (yield 10.8 mol%) were obtained. The physical properties of the dye (16) and the analyses used for the identification of this compound are shown in Table 3 and the physical properties of the dye (133) and the analyses used for the identification of this compound in Table 4.

EXAMPLE 13 AND 14

By following the procedures of Examples 1 and 2 while using about 2.4 g (19.5 mmols) of p-anisidine in place of aniline, 1.39 g of 6-(p-methoxyanilino)-5,7,8-trifluoroquinizarin [dye (15)] (yield 34.8 mol%) and 0.56 g of 6,7-bis(p-methoxyanilino)-5,8-difluoroquinizarin [dye (132)] (yield 11.2 mol%) were obtained. The physical properties of the dye (15) and the analyses used for the identification of this compound are shown in Table 3 and the physical properties of the dye (132) and the analyses used for the identification of this compound in Table 4.

EXAMPLES 15 AND 16

By following the procedures of Examples 1 and 2 while using about 2.9 g (19.4 mmols) of 4-tert.-butyl aniline in place of aniline, 1.26 g of 6-(p-tertiary butylanilino)-5,7,8-trifluoroquinizarin [dye (13)] (yield 29.7 mol %) and 0.43 g of 6,7-bis(p-tertiary butylanilino)- 5,8-difluoroquinizarin [dye (130)] (yield 7.8 mol %) were obtained. The physical properties of the dye (13) and the analyses used for the identification of this compound are shown in Table 23 and the physical properties of the dye (130) and the analyses used for the identification of this compound in Table 4.

EXAMPLE 17

In a four-neck flask of 500 cc in inner volume, 400 cc of chloroform, 3 g (9.61 mmols) of 5,6,7,8-tetrafluoroquinizarin, about 0.7 g (9.57 mmols) of n-butyl amine and 0.67 g (11.5 mmols) of potassium fluoride were placed and left reacting at room temperature for about 24 hours. After the reaction, the reaction solution was filtered to separate potassium fluoride, distilled to expel chloroform, and then washed with water and dried to obtain 3.1 g of a crude product. This crude product was refined by means of a column packed with silica gel (Wakogel C-200) to obtain 2.92 g of 6-butylamino-5,7,8-trifluoroquinizarin [dye (117)] (yield 83.2 mol%). The physical properties of the dye and the analyses used for the identification of this compound are shown in Table 2.

EXAMPLE 18

By following the procedure of Example 17 while increasing the amount of n-butyl aniline to about 2.1 g (28.7 mmols) and that of potassium fluoride to 2.01 g (34.0 mmols), 2.27 g of 5,6,7-tris(butylamino)-8-fluoroquinizarin [dye (248)] (yield 50.1 mol%) was obtained. The physical properties of this dye and the analyses used for the identification of this compound are shown in Table 5.

EXAMPLE 19

In a four-neck flask of 500 cc in inner volume, 400 cc of acetonitrile, 3 g (9.61 mmols) of 5,6,7,8-tetrafluoroquinizarin, about 0.95 g (9.58 mmols) of cyclohexyl amine, and 0.67 g (11.5 mmols) of potassium fluoride were placed and left reacting at 50° C. for about 24 hours. After the reaction, the reaction solution was filtered to separate potassium fluoride, distilled to expel acetonitrile, and then washed with water and dried to obtain 3.3 g of a crude product. This crude product was refined by means of a column packed with silica gel (Wakogel C-200) to obtain 2.02 g of 6-cyclohexylamino-5,6,8-trifluoroquinizarin [dye (119)] (yield 53.7 mol %). The physical properties of the dye and the analyses used for the identification of this compound are shown in Table 2.

EXAMPLES 20 AND 21

In a four-neck flask of 200 cc in inner volume, 100 g of p-aminobenzonitrile and 3 g (9.61 mmols) of 5,6,7,8-tetrafluoroquinizarin were placed and left reacting at 120° C. for about 4 hours. After the reaction, the reaction solution was thrown in a mixture of about 400 cc of acetone with about 500 cc of water and acidified with concentrated hydrochloric acid to induce separation of solids. The solids were separated by filtration, washed with water, and dried to obtain 4.8 g of a crude product. Then, this crude product was refined by means of a column packed with silica gel (Wakogel C-200) to obtain 1.21 g of 6-(p-cyanoanilino)-5,7,8-trifluoroquinizarin [dye (10)] (yield 30.7 mol %) and 0.45 g of 6,7-bis(p-cyanoanilino)-5,8-difluoroquinizarin [dye (126)] (yield 9.2 mol %) were obtained. The physical properties of the dye (10) and the analysis used for the identification of this compound are shown in Table 1 and the physical properties of the dye (126) and the analyses used for the identification of this compound in Table 4.

EXAMPLE 22

Four (4) g (12.6 mmols) of 4-cyanoanilino-3,5-6-trifluorophthalic anhydride and 4.34 g (31.4 mmols) of p-dimethoxy benzene were added piecemeal into a fused mass (130° to 135° C.) consisting of 50 g (0.37 mol) of anhydrous aluminum chloride and 5 g of sodium chloride. The resultant mixture was then heated and kept stirred at 180° C. for one hour. Then, the reaction solution was poured into ice water and then 50 cc of concentrated hydrochloric acid was added thereto to induce separation of solids. The solids were separated by filtration, washed with water, and dried to obtain 3.2 g of a crude product. Then, the crude product was refined by means of a column packed with silica gel (Wakogel C-200) to obtain 1.92 g of 6-(p-cyanoanilino)-5,7,8-trifluoroquinizarin [dye (10)] (yield 37.2 mol %).

Mass spectrum:

m/e=410 (M$^+$, 100)

m/e=391 (M$^+$–19, 20)

| | Elementary analyses: | | | |
|---|---|---|---|---|
| | C (%) | H (%) | N (%) | F (%) |
| Theoretical value | 61.47 | 2.21 | 6.83 | 13.89 |
| Measured value | 61.52 | 2.23 | 6.79 | 13.82 |

EXAMPLE 23

By following the procedures of Examples 20 and 21 while using 100 g of p-nitroaniline in place of p-aminobenzonitrile and changing the reaction temperature to 160° C., 1.17 g of 6-(p-nitroanilino)-5,7,8-trifluoroquinizarin [dye (12)] (yield 28.3 mol %) was obtained. The physical properties of this dye and the analyses used for the identification of this compound are shown in Table 2.

EXAMPLES 24 AND 25

By following the procedures of Examples 20 and 21 while using 100 g of 2,6-diethyl aniline in place of p-aminobenzonitrile, 1.36 g of 6-(2,6-diethylanilino)-5,7,8-trifluoroquinizarin [dye (18)] (yield 32.1 mol %) and 0.58 g of 6,7-bis(2,6-diethylanilino)-5,8-difluoroquinizarin [dye (137)] (yield 10.6 mol %) were obtained. The physical properties of the dye (18) and the analyses used for the identification of this compound are shown in Table 3 and the physical properties of the dye (137) and the analyses used for the identification of this compound in Table 5.

EXAMPLE 26

In a four-neck flask of 500 cc in inner volume, 400 c of acetonitrile, 3 g (8.21 mmols) of 6-butylamino-5,7,8-trifluoroquinizarin [dye (117)], about 0.92 g (9.88 mmols) of aniline, and 0.57 g (9.81 mmols) of potassium fluoride were placed and refluxed for reaction for about 24 hours. After the reaction, the reaction solution was filtered to separate potassium fluoride, distilled to expel acetonitrile, and then washed with water and dried to obtain 3.9 g of a crude product. Then, this crude product was refined by means of a column packed with silica gel (Wakogel C-200) to obtain 1.20 g of 6-anilino-7-butylamino-5,8-difluoroquinizarin [dye (229)] (yield 33.3 mol %). The physical properties of this dye and the analyses used for the identification of this compound are shown in Table 5.

EXAMPLE 27

By following the procedure of Example 26 while using 1.63 g (9.87 mmols) of m-aminoethyl benzoate in place of aniline, 1.27 g of 6-(m-ethoxycarbonylanilino)-7-butylamino-5,8-difluoroquinizarin [dye (227)] (yield 30.3 mol %) was obtained. The physical properties of this dye and the analyses used for the identification of this compound are shown in Table 4.

EXAMPLE 28

By following the procedure of Example 26 while using 1.21 g (9.82 mmols) p-anisidine in place of aniline, 1.31 g of 6-(p-methoxyanilino)-7-butylamino-5,8-difluoroquinizarin [dye (228)] (yield 34.1 mol %) was obtained. The physical properties of this dye and the analyses used for the identification of this compound are shown in Table 5.

EXAMPLE 29

In a four-neck flask of 500 cc in inner volume, 400 cc of acetonitrile, 3 g (9.61 mmols) of 5,6,7,8-tetrafluoroquinizarin, 2.12 g (19.2 mmols) of thiophenol, and 1.34 g (23.1 mmols) of potassium fluoride were placed and refluxed for reaction for about 8 hours. After the reaction, the reaction solution was filtered to separate potassium fluoride, distilled to expel acetonitrile, and then dried to obtain 4.6 g of 6,7-diphenylthio-5,8-difluoroquinizarin [dye (298)] (yield 97.2 mol %). The physical properties of this dye and the analyses used for the identification of this compound are shown in Table 6.

EXAMPLE 30

By following the procedure of Example 29 while using 4.35 g (19.2 mmols) of 4-mercapto-2,3,5-6-tetrafluorobenzoic acid in place of thiophenol, 5.45 g of 6,7-bis(4-carboxy-2,3,5,6-tetrafluorophenylthio)-5,8-difluoroquinizarin [dye (299)] (yield 78.3 mol %) was obtained. The physical properties of this dye and the analyses used for the identification of this compound are shown in Table 7.

EXAMPLE 31

By following the procedure of Example 29 while using 3.98 g (19.2 mmols) of 4-mercapto-2,3,5-6-tetrafluorobenzonitrile in place of thiophenol, 4.83 g of 6,7-bis(4-cyano-2,3,5,6-tetrafluorophenylthio)-5,8-difluoroquinizarin [dye (300)] (yield 73.2 mol %) was obtained. The physical properties of this dye and the analyses used for the identification of this compound are shown in Table 7.

EXAMPLE 32

By following the procedure of Example 29 while using 2.43 g (19.3 mmols) of p-mercaptophenol in place of thiophenol, 4.41 g of 6,7-bis(p-hydroxyphenylthio)-5,8-difluoroquinizarin [dye (301)] (yield 87.5 mol %) was obtained. The physical properties of this dye and the analyses used for the identification of this compound are shown in Table 7.

EXAMPLE 33

By following the procedure of Example 29 while using 2.69 g (19.2 mmols) of p-methoxybenzenethiol in place of thiophenol, 4.52 g of 6,7-bis(p-methoxyphenylthio)-5,8-difluoro-quinizarin [dye (302)] (yield 85.1 mol %) was obtained. The physical properties of this dye and the analyses used for the identification of this compound are shown in Table 7.

EXAMPLE 34

By following the procedure of Example 29 while using 2.28 g (19.2 mmols) of hexanethiol in place of thiophenol, 4.51 g of 6,7-dihexylthio-5,8-difluoroquinizarin [dye (303)] (yield 92.3 mol %) was obtained. The physical properties of this dye and the analyses used for the identification of this compound are shown in Table 6.

EXAMPLE 35

By following the procedure of Example 29 while using 2.81 g (19.2 mmols) of octanethiol in place of thiophenol, 4.91 g of 6,7-dioctylthio-5,8-difluoroquinizarin [dye (304)] (yield 90.5 mol %) was obtained. The physical properties of this dye and the analyses used for the identification of this compound are shown in Table 6.

EXAMPLE 36

By following the procedure of Example 29 while using 1.74 g (19.2 mmols) of tert.-butylthiol in place of thiophenol, 4.02 g of 6,7-ditertiary butylthio-5,8-difluoroquinizarin [dye (305)] (yield 92.3 mol %) was obtained. The physical properties of this dye and the analyses used for the identification of this compound are shown in Table 6.

EXAMPLE 37

By following the procedure of Example 29 while using 2.23 g (19.2 mmols) of cyclohexane thiol in place of thiophenol, 4.54 g of 6,7-dicyclohexylthio-5,8-difluoroquinizarin [dye (306)] (yield 93.6 mol %) was obtained. The physical properties of this dye and the analyses used for the identification of this compound are shown in Table 6.

EXAMPLE 38

By following the procedure of Example 29 while increasing the amount of thiophenol to 4.24 g (38.5 mmols) and that of potassium fluoride to 2.68 g (46.1 mmols) and changing the reaction time to 16 hours, 5.93 g 5,6,7,8-tetraphenylthioquinizarin [dye (307)] (yield 91.7 mol %) was obtained. The physical properties of this dye and the analyses used for the identification of this compound are shown in Table 7.

EXAMPLE 39

By following the procedure of Example 38 while using 3.48 g (38.5 mmols) of n-butyl thiol in place of thiophenol, 5.09 g of 5,6,7,8-tetrabutylthioquinizarin [dye (308)] (yield 89.3 mol %) was obtained. The physical properties of this dye and the analyses used for the identification of this compound are shown in Table 7.

EXAMPLE 40

In a four-neck flask of 500 cc in inner volume, 400 cc of octyl alcohol, 3 g (6.18 mmols) of 6-(p-butoxycarbonylanilino)-5,7,8-trifluoroquinizarin [dye (6)] and 0.347 g (6.18 mmol) of potassium hydroxide were placed and left reacting at 120° C. for about 5 hours. After the reaction, the reaction solution was transferred into a separation funnel, combined with water, and shaken therein to effect separation. Then, the organic layer was distilled to expel octyl alcohol. The solids remaining after the distillation were dried to obtain 3.55 g of 6-(p-butoxycarbonylanilino)-7-octyloxy-5,8-difluoroquinizarin [dye (36)] (yield 96.4 mol %). The physical properties of this dye and the analyses used for the identification of this compound are shown in Table 8.

EXAMPLE 41

By following the procedure of Example 40 while using 3 g (6.56 mmols) of the dye (4) in place of the dye (6) and further using 0.368 g (6.56 mmols) of potassium hydroxide, 3.62 g of 6-(m-ethoxycarbonylanilino)-7-octyloxy-5,8-difluoroquinizarin [dye (34)] (yield 97.2 mol %) was obtained. The physical properties of this dye and the analyses used for the identification of this compound are shown in Table 8.

EXAMPLE 42

By following the procedure of Example 40 while using 3 g (7.31 mmols) of the dye (10) in place of the dye (6) and further using 0.41 g (7.31 mmols) of potassium hydroxide, 3.66 g of 6-(p-cyanoanilino)-7-octyloxy-5,8-difluoroquinizarin [dye (45)] (yield 96.2 mol %) was obtained. The physical properties of this dye and the analyses used for the identification of this compound are shown in Table 8.

EXAMPLE 43

By following the procedure of Example 40 while using 3 g (6.97 mmols) of the dye (12) in place of the dye (6) and further using 0.391 g (6.97 mmols) of potassium hydroxide, 3.61 g of 6-(p-nitroanilino)-7-octyloxy-5,8-difluoroquinizarin [dye (41)] (yield 95.8 mol %) was obtained. The physical properties of this dye and the analyses used for the identification of this compound are shown in Table 8.

EXAMPLE 44

By following the procedure of Example 40 while using 3 g (6.80 mmols) of the dye (18) in place of the dye (6) and further using 0.381 g (6.80 mmols) of potassium hydroxide, 3.56 g of 6-(2,6-diethylanilino)-7-octyloxy-5,8-difluoroquinizarin [dye (51)] (yield 94.9 mol %) was obtained. The physical properties of this dye and the analyses used for the identification of this compound are shown in Table 8.

EXAMPLE 45

In a four-neck flask of 500 cc in inner volume, 400 cc of n-butanol, 3 g (6.18 mmols) of 6-(m-butoxycarbonylanilino)-5,7,8-trifluoroquinizarin [dye (7)], and 0.694 g (12.4 mmols) of potassium hydroxide were placed and refluxed for reaction for about 6 hours. After the reaction, the reaction solution was transferred into a separation funnel, combined with water, and shaken therein to effect separation. Then, the organic layer was distilled to expel n-butanol. The solids remaining after the distillation were dried to obtain 3.3 g of a crude product. Then, the crude product was refined by means of a column packed with silica gel (Wakogel C-200) to obtain 2.36 g of 6-(m-butoxy-carbonylanilino)-5(or 8),7-dibutoxy-5-fluoroquinizarin [dye (69)] (yield 64.3 mol %). The physical properties of this dye and the analyses used for the identification of this compound are shown in Table 8.

EXAMPLE 46

By following the procedure of Example 45 while using 3 g (6.18 mmols) of 6-(p-butoxycarbonylanilino)-5,7,8-trifluoroquinizarin in place of 6-(m-butoxycarbonylanilino)-5,7,8-trifluoroquinizarin and n-octyl alcohol in place of n-butanol and changing the reaction temperature to 120° C., 2.43 g of 6-(p-butoxycarbonylanilino)-5(or 8),7-dioctyloxy-5-fluoroquinizarin [dye (70)] (yield 55.7 mol %) was obtained. The physical properties of this dye and the analyses used for the identification of this compound are shown in Table 9.

EXAMPLE 47

In a four-neck flask of 500 cc in inner volume, 400 cc of aqua ammonia (29%) and 3 g (6.09 mmols) of 6,7-diphenylthio-5,8-difluoroquinizarin [dye (298)] were placed and left reacting at room temperature for about 12 hours. After the reaction, the reaction solution was neutralized with concentrated hydrochloric acid to induce separation of solids. The solids were separated by filtration, washed with water and dried to obtain 2.9 g of a crude product. Then, this crude product was refined by means of a column packed with silica gel (Wakogel C-200) to obtain 0.72 g of 5-amino-6,7-diphenylthio-8-fluoroquinizarin [dye (296)] (yield 24.1 mol %). The physical properties of this dye and the analyses used for the identification of this compound are shown in Table 9.

EXAMPLE 48

In a four-neck flask of 500 cc in inner volume, 400 cc of octyl alcohol, 3 g (6.84 mmols) of 6-anilino-7-butylamino-5,8-difluoroquinizarin [dye (229)], and 0.384 g (6.84 mmols) of potassium hydroxide were placed and left reacting at 120° C. for about 5 hours. After the reaction, the reaction solution was transferred into a separation funnel, combined with water, and shaken therein to effect separation. Then, the organic layer was distilled to expel octyl alcohol. The solids remaining after the distillation were dried to obtain 3.63 g of 6-anilino-7-butylamino-8(or 5)-octyloxy-5(or 8)-fluoroquinizarin [dye (193)] (yield 96.7 mol %). The physical properties of this dye and the analyses used for the identification of this compound are shown in Table 9.

EXAMPLE 49

By following the procedure of Example 48 while using 3 g (5.88 mmols) of the dye (227) in place of the dye (229) and further using 0.33 g (5.88 mmols) of potassium hydroxide, 3.44 g of 6-(m-ethoxycarbonylanilino)-7-butylamino-8(or 5)-octyloxy-5(or 8)-fluoroquinizarin [dye (197)] (yield 94.3 mol %) was obtained. The physical properties of this dye and the analyses used for the identification of this compound are shown in Table 9.

EXAMPLE 50

In a four-neck flask of 200 cc in inner volume, 100 g of aniline and 3 g (6.09 mmols) of 6,7-diphenylthio-5,8-difluoro-quinizarin [dye (298)] were placed and left reacting at 150° C. for about 4 hours. After the reaction, the reaction solution was thrown into a mixture consisting of about 400 cc of acetone with about 500 cc of water and then acidified with concentrated hydrochloric acid to induce separation of solids. The solids were separated by filtration, washed with water, and dried to obtain 3.2 g of a crude product. Then, this crude product was refined by means of a column packed with silica gel (Wakogel C-200) to obtain 1.21 g of 5,8-dianilino-6,7-diphenylthioquinizarin [dye (297)] (yield 31.2 mol %). The physical properties of this dye and the analyses used for the identification of this compound are shown in Table 9.

EXAMPLES 51 AND 52

By following the procedures of Examples 20 and 21 while using 100 g of 2,6-dichloroaniline in place of p-aminobenzonitrile and changing the reaction temperature to 200° C., 1.28 g of 6-(2,6-dichloroanilino)-5,7,8-trifluoroquinizarin [dye (22)] (yield 29.3 mol %) and 0.43 g of 6,7-bis(2,6-dichloroanilino)-5,8-difluoroquinizarin [dye (138)] (yield 7.51 mol %) were obtained. The physical properties of the dye (22) and the analyses used for the identification of this compound are shown in Table 3 and the physical properties of the dye (138) and the analyses used for the identification of this compound in Table 5.

EXAMPLES 53 AND 54

By following the procedures of Examples 20 and 21 while using 100 g of 2,6-diisopropyl aniline in place of p-aminobenzonitrile, 1.68 g of 6-(2,6-diisopropylanilino)-5,7,8-trifluoroquinizarin [dye (25)] (yield 37.3 mol %) and 0.79 g of 6,7-bis(2,6-diisopropylanilino)-5,8-difluoroquinizarin [dye (139)] (yield 13,1 mol %) were obtained. The physical properties of the dye (25) and the analyses used for the identification of this compound are shown in Table 3 and the physical properties of the dye (139) and the analyses used for the identification of this compound in Table 5.

TABLE 1

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Color tone |
|---|---|---|---|---|---|---|---|---|---|---|---|
| (1) | 533 ε: 14800 | ○ | Δ | 185 | 385 (M⁺, 100) 366 (M⁺ −19, 60) | Theoretical value Measured value | 62.34 62.29 | 2.62 2.66 | 3.64 3.69 | 14.79 14.82 | Magenta |
| (4) | 527 ε: 15300 | ○ | ○ | 190 | 457 (M⁺, 100) 412 (M⁺ −45, 30) 465 (M⁺ −92, 50) | Theoretical value Measured value | 60.40 60.46 | 3.09 3.07 | 3.06 3.10 | 12.46 12.42 | Magenta |
| (5) | 530 ε: 8600 | ⊙ | ⊙ | 147 | 485 (M⁺, 100) 412 (M⁺ −73, 60) 391 (M⁺ −94, 50) | Theoretical value Measured value | 61.86 61.83 | 3.74 3.72 | 2.89 2.92 | 11.74 11.75 | Magenta |
| (6) | 528 ε: 17900 | ○ | ○ | 201 | 485 (M⁺, 90) 428 (M⁺ −57, 20) 412 (M⁺ −73, 100) | Theoretical value Measured value | 61.86 61.81 | 3.74 3.68 | 2.89 2.91 | 11.74 11.77 | Magenta |
| (8) | 526 ε: 17600 | ○ | ○ | 115 | 541 (M⁺, 100) 428 (M⁺ −113, 20) | Theoretical value Measured value | 64.32 64.30 | 4.84 4.86 | 2.59 2.63 | 10.52 10.51 | Magenta |
| (10) | 523 ε: 20600 | Δ | Δ | 294 | 410 (M⁺, 100) 391 (M⁺ −19, 30) | Theoretical value Measured value | 61.47 61.41 | 2.21 2.18 | 6.83 6.90 | 13.89 13.94 | Magenta |

TABLE 2

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Color tone |
|---|---|---|---|---|---|---|---|---|---|---|---|
| (12) | 521 ε: 16300 | Δ | Δ | 223 | 430 (M⁺, 100) 411 (M⁺ −19, 20) | Theoretical value Measured value | 55.83 55.83 | 2.11 2.04 | 6.51 6.57 | 13.25 13.19 | Magenta |
| (117) | 533 ε: 17900 | ○ | ○ | 170 | 365 (M⁺, 100) 322 (M⁺ −43, 100) | Theoretical value Measured value | 59.18 59.23 | 3.86 3.83 | 3.83 3.80 | 15.60 15.58 | Magenta |
| (119) | 536 ε: 24500 | ○ | ○ | 167 | 391 (M⁺, 100) 348 (M⁺ −43, 30) 308 (M⁺ −83, 30) | Theoretical value Measured value | 61.38 61.41 | 4.12 4.08 | 3.58 3.50 | 14.56 14.57 | Magenta |
| (13) | 540 ε: 11900 | ○ | ○ | 184 | 441 (M⁺, 70) 426 (M⁺ −15, 100) | Theoretical value Measured value | 65.31 65.28 | 4.11 4.13 | 3.17 3.21 | 12.91 12.89 | Magenta |
| (14) | 557 ε: 15300 | ○ | ○ | 240 | 415 (M⁺, 100) 396 (M⁺ −19, 70) | Theoretical value Measured value | 60.73 60.78 | 2.91 2.88 | 3.37 3.38 | 13.72 13.68 | Purple |

TABLE 3

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Cl (%) | Color tone |
|---|---|---|---|---|---|---|---|---|---|---|---|---|
| (15) | 542 ε: 10200 | ○ | ○ | — | 415 (M⁺, 100) 400 (M⁺ −15, 30) | Theoretical value Measured value | 60.73 60.80 | 2.91 2.93 | 3.37 3.35 | 13.72 13.70 | | Magenta |
| (16) | 532 ε: 16300 | ○ | ○ | 222 | 415 (M⁺, 100) 396 (M⁺ −19, 50) | Theoretical value Measured value | 60.73 60.70 | 2.91 2.86 | 3.37 3.41 | 13.72 13.73 | | Magenta |
| (18) | 528 ε: 14200 | ⊙ | ○ | 206 | 441 (M⁺, 100) 422 (M⁺ −19, 30) | Theoretical value | 65.31 | 4.11 | 3.17 | 12.91 | | Magenta |

TABLE 3-continued

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Cl (%) | Color tone |
|---|---|---|---|---|---|---|---|---|---|---|---|---|
| | | | | | 407 (M+ −34, 80) | Measured value | 65.25 | 4.08 | 3.22 | 12.90 | | |
| (22) | 521 ε: 9470 | ⊙ | ○ | 222 | 454 (M+, 70) 419 (M+ −35, 100) | Theoretical value | 52.89 | 1.78 | 3.08 | 12.55 | 15.61 | Magenta |
| | | | | | 456 (M++2, 20) | Measured value | 52.93 | 1.75 | 3.13 | 12.51 | 15.55 | |
| (25) | 530 ε: 12800 | ⊙ | ○ | — | 469 (M+, 100) 450 (M+ −19, 20) | Theoretical value | 66.50 | 4.73 | 2.98 | 12.15 | | Magenta |
| | | | | | 435 (M+ −34, 70) | Measured value | 66.43 | 4.68 | 3.06 | 12.10 | | |
| (120) | 648 ε: 19800 | Δ | Δ | 297 | 458 (M+, 100) 439 (M+ −19, 10) | Theoretical value | 68.12 | 3.52 | 6.11 | 8.29 | | Cyan |
| | | | | | 420 (M+ −38, 20) | Measured value | 68.15 | 3.48 | 6.17 | 8.23 | | |
| (121) | 644 ε: 20100 | ○ | ○ | 247 | 602 (M+, 100) 573 (M+ −29, 5) | Theoretical value | 63.79 | 4.01 | 4.65 | 6.31 | | Cyan |
| | | | | | | Measured value | 63.87 | 3.93 | 4.70 | 6.28 | | |
| (122) | 614 ε: 14700 | ○ | ○ | 195 | 658 (M+, 100) 391 (M+ −267, 10) | Theoretical value | 65.65 | 4.90 | 4.25 | 5.77 | | Blue |
| | | | | | | Measured value | 65.61 | 4.90 | 4.30 | 5.71 | | |

TABLE 4

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Color tone |
|---|---|---|---|---|---|---|---|---|---|---|---|
| (126) | 605 ε: 16600 | Δ | Δ | 317 | 508 (M+, 100) 489 (M+ −19, 5) | Theoretical value Measured value | 66.14 66.09 | 2.78 2.81 | 11.02 11.00 | 7.47 7.52 | Blue |
| (130) | 660 ε: 26700 | ○ | ○ | 269 | 570 (M+, 100) 555 (M+ −15, 30) | Theoretical value Measured value | 71.56 71.51 | 5.65 5.71 | 4.91 4.88 | 6.66 6.65 | Cyan |
| (131) | 661 ε: 15600 | ○ | ○ | 276 | 518 (M+, 100) 484 (M+ −34, 20) | Theoretical value Measured value | 64.86 64.91 | 3.89 3.90 | 5.40 5.33 | 7.33 7.29 | Cyan |
| (132) | 649 ε: 13400 | ○ | ○ | 267 | 518 (M+, 100) 503 (M+ −15, 20) | Theoretical value Measured value | 64.86 64.88 | 3.89 3.92 | 5.40 5.36 | 7.33 7.25 | Cyan |
| (133) | 651 ε: 13400 | ○ | ○ | 242 | 518 (M+, 100) 499 (M+ −19, 20) | Theoretical value Measured value | 64.86 64.93 | 3.89 3.82 | 5.40 5.39 | 7.33 7.36 | Cyan |
| (227) | 661 ε: 21000 | ○ | ○ | 162 | 510 (M+, 100) 467 (M+ −43, 60) | Theoretical value Measured value | 63.53 63.59 | 4.74 4.69 | 5.49 5.54 | 7.44 7.37 | Cyan |

TABLE 5

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Cl (%) | Color tone |
|---|---|---|---|---|---|---|---|---|---|---|---|---|
| (228) | 666 ε: 22800 | ○ | ○ | 163 | 468 (M+, 100) 425 (M+ −43, 60) | Theoretical value | 64.10 | 4.73 | 5.98 | 8.11 | | Cyan |
| | | | | | | Measured value | 64.04 | 4.69 | 6.03 | 8.09 | | |
| (229) | 666 ε: 15300 | ○ | ○ | 174 | 438 (M+, 100) 395 (M+ −43, 70) | Theoretical value | 65.75 | 4.60 | 6.39 | 8.67 | | Cyan |
| | | | | | | Measured value | 65.80 | 4.58 | 6.45 | 8.64 | | |
| (137) | 657 ε: 30000 | ⊙ | ○ | 262 | 570 (M+, 100) 541 (M+ −29, 10) | Theoretical value | 71.56 | 5.65 | 4.91 | 6.66 | | Cyan |
| | | | | | | Measured value | 71.61 | 5.67 | 4.86 | 6.59 | | |
| (138) | 630 ε: 22300 | ○ | ○ | 260 | 596 (M+, 100) 561 (M+ −35, 30) | Theoretical value | 52.38 | 2.03 | 4.70 | 6.37 | 23.79 | Blue |
| | | | | | 598 (M++2, 30) | Measured value | 52.41 | 1.99 | 4.65 | 6.43 | 23.82 | |

TABLE 5-continued

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Cl (%) | Color tone |
|---|---|---|---|---|---|---|---|---|---|---|---|---|
| (248) | 614 ε: 14900 | ○ | ○ | 83 | 471 (M+, 100) 428 (M+ −43, 10) 414 (M+ −57, 80) | Theoretical value Measured value | 66.22 66.19 | 7.27 7.31 | 8.91 8.87 | 4.03 3.99 | | Blue |
| (139) | 660 ε: 26000 | ⊚ | ○ | — | 626 (M+, 100) 592 (M+ −34, 30) | Theoretical value Measured value | 72.81 72.74 | 6.44 6.41 | 4.47 4.53 | 6.07 6.05 | | Cyan |

TABLE 6

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Color tone |
|---|---|---|---|---|---|---|---|---|---|---|---|
| (305) | 506 ε: 15300 | ⊚ | ⊚ | — | 453 (M+, 10) 396 (M+ −57, 100) 339 (M+ −114, 20) | Theoretical value Measured value | 58.39 58.43 | 4.90 4.81 | 14.17 14.26 | 8.40 8.39 | Orange |
| (303) | 506 ε: 11300 | ○ | ○ | — | 508 (M+, 100) 589 (M+ −19, 20) | Theoretical value Measured value | 61.40 61.35 | 5.94 5.90 | 12.61 12.71 | 7.47 7.45 | Orange |
| (304) | 504 ε: 14600 | ○ | ○ | — | 564 (M+, 100) 545 (M+ −19, 5) | Theoretical value Measured value | 63.80 63.87 | 6.78 6.81 | 11.35 11.31 | 6.73 6.69 | Orange |
| (306) | 508 ε: 14000 | ⊚ | ○ | — | 504 (M+, 90) 338 (M+ −116, 100) | Theoretical value Measured value | 61.89 61.94 | 5.19 5.21 | 12.71 12.66 | 7.53 7.49 | Orange |
| (298) | 489 ε: 12700 | ⊚ | ○ | — | 429 (M+, 60) 77 (M+ −352, 100) | Theoretical value Measured value | 63.41 63.49 | 2.87 2.91 | 13.02 12.98 | 7.71 7.67 | Orange |

TABLE 7

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | S (%) | F (%) | O (%) | Color tone |
|---|---|---|---|---|---|---|---|---|---|---|---|---|---|
| (301) | 514 ε: 12900 | ○ | ○ | — | 524 (M+, 100) 505 (M+ −19, 10) 398 (M+ −126, 50) | Theoretical value Measured value | 59.54 59.62 | 2.69 2.71 | | 12.22 12.18 | 7.24 7.21 | | Cinnabar red |
| (302) | 504 ε: 15100 | ○ | ○ | — | 552 (M+, 100) 533 (M+ −19, 10) 412 (M+ −140, 20) | Theoretical value Measured value | 60.86 60.93 | 3.28 3.29 | | 11.60 11.57 | 6.88 6.79 | | Cinnabar red |
| (299) | 510 ε: 12600 | Δ | Δ | — | 724 (M+, 20) 686 (M+ −38, 20) 667 (M+ −82, 100) | Theoretical value Measured value | 46.42 46.33 | 0.83 0.77 | | 8.85 8.93 | 26.22 26.24 | | Cinnabar red |
| (300) | 521 ε: 13200 | Δ | Δ | — | 686 (M+, 100) 642 (M+ −44, 40) 499 (M+ −187, 70) | Theoretical value Measured value | 48.99 49.08 | 0.59 0.63 | 4.08 4.12 | 9.34 9.27 | 27.68 27.56 | | Cinnabar red |
| (308) | 530 ε: 11100 | ⊚ | ○ | — | 592 (M+, 30) 535 (M+ −57, 50) 478 (M+ −114, 100) | Theoretical value Measured value | 60.78 60.77 | 6.80 6.71 | 21.63 21.67 | | | 10.79 10.85 | Magenta |
| (307) | 495 ε: 12600 | ○ | ○ | — | 673 (M+, 100) 77 (M+ −596, 30) | Theoretical value Measured value | 67.83 67.80 | 3.60 3.65 | 19.06 19.01 | | | 9.51 9.54 | Brown |

TABLE 8

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | F (%) | Color tone |
|---|---|---|---|---|---|---|---|---|---|---|---|
| (34) | 531 ε: 12400 | ◎ | ◎ | 131 | 567 (M⁺, 70) 454 (M⁺ −113, 100) | Theoretical value Measured value | 65.60 65.67 | 5.50 5.50 | 2.47 2.51 | 6.69 6.62 | Magenta |
| (36) | 534 ε: 12700 | ◎ | ◎ | 101 | 595 (M⁺, 80) 482 (M⁺ −113, 100) | Theoretical value Measured value | 66.54 66.56 | 5.92 5.88 | 2.35 2.32 | 6.38 6.36 | Magenta |
| (41) | 524 ε: 13200 | ◎ | ◎ | 116 | 540 (M⁺, 70) 427 (M⁺ −113, 100) | Theoretical value Measured value | 62.22 62.30 | 4.85 4.87 | 5.18 5.15 | 7.03 6.68 | Magenta |
| (45) | 524 ε: 15400 | ◎ | ◎ | 127 | 520 (M⁺, 50) 407 (M⁺ −113, 100) | Theoretical value Measured value | 66.92 66.89 | 5.03 5.01 | 5.38 5.41 | 7.30 7.28 | Magenta |
| (51) | 563 ε: 11400 | ◎ | ◎ | — | 551 (M⁺, 100) 438 (M⁺ −113, 80) | Theoretical value Measured value | 69.68 69.74 | 6.39 6.40 | 2.54 2.49 | 6.89 6.93 | Purple |
| (69) | 538 ε: 15000 | ◎ | ◎ | — | 593 (M⁺, 100) 536 (M⁺ −57, 60) | Theoretical value Measured value | 66.77 66.80 | 6.11 6.10 | 2.36 2.39 | 3.20 3.17 | Magenta |

TABLE 9

| Dye No. | λ max (nm) ε (in chloroform) | Solubility in toluene | Solubility in methyl ethyl ketone | Melting point (°C.) | Mass spectrum | | Elemental analysis C (%) | H (%) | N (%) | S (%) | F (%) | O (%) | Color tone |
|---|---|---|---|---|---|---|---|---|---|---|---|---|---|
| (70) | 538 ε: 12800 | ◎ | ◎ | — | 705 (M⁺, 100) 592 (M⁺ −113, 10) 479 (M⁺ 226, 20) | Theoretical value Measured value | 69.77 69.75 | 7.43 7.44 | 1.98 1.97 | | 2.69 2.74 | | Magenta |
| (296) | 542 ε: 12300 | ○ | ○ | — | 489 (M⁺, 100) 77 (M⁺ −412, 30) | Theoretical value Measured value | 63.79 63.75 | 3.29 3.30 | 2.86 2.84 | 13.10 13.13 | 3.88 3.89 | | Purple |
| (193) | 668 ε: 15300 | ◎ | ◎ | — | 548 (M⁺, 100) 529 (M⁺ −19, 10) 435 (M⁺ 113, 30) | Theoretical value Measured value | 70.05 70.08 | 6.80 6.79 | 5.11 5.09 | | 3.46 3.47 | | Cyan |
| (197) | 665 ε: 13800 | ◎ | ◎ | — | 620 (M⁺, 100) 507 (M⁺ −113, 20) | Theoretical value Measured value | 67.73 67.69 | 6.66 6.68 | 4.51 4.48 | | 3.06 3.10 | | Cyan |
| (297) | 692 ε: 15900 | ○ | ○ | — | 638 (M⁺, 70) 77 (M⁺ −561, 100) | Theoretical value Measured value | 71.45 71.52 | 4.10 4.05 | 4.39 4.42 | 10.04 9.98 | | 10.02 10.03 | Cyan |

EXAMPLE 55

In a four-neck flask of 100 cc in inner volume, 50 cc of acetonitrile, 0.5 g (1.09 mmols) of 6-(m-ethoxycarbonylanilino)-5,7,8-trifluoroquinizarin, 0.1 g (1.72 mmols) of potassium fluoride, and 0.12 g (1.09 mmols) of thiophenol were placed and refluxed for reaction for about 2.5 hours. After the reaction, the reaction solution was filtered to remove potassium fluoride and then the organic layer was distilled to expel acetonitrile. The solids remaining after the distillation were dried to obtain 0.56 g of 6-(m-ethoxycarbonylanilino)-7-(phenylthio)-5,8-difluoroquinizarin [dye (115)] (yield 91.9 mol %). The physical properties of this dye and the analyses used for the identification of this compound are shown below.

Visible absorption spectrum (in chloroform):

λmax 540 nm (ε: 17000)
Mass spectrum:

m/e=547 (M⁺, 100)
m/e=501 (M⁺−46, 20)

Elementary analyses:

| | C (%) | H (%) | N (%) | S (%) | F (%) |
|---|---|---|---|---|---|
| Theoretical value | 63.61 | 3.50 | 2.56 | 5.84 | 6.95 |
| Measured value | 63.48 | 3.43 | 2.67 | 5.78 | 6.97 |

EXAMPLE 56

In a four-neck flask of 100 cc in inner volume, 50 cc of α-chloronaphthalene, 0.5 g (0.80 mmol) of 6,7-bis(2,6-diisopropylanilino)-5,8-difluoroquinizarin, 0.07 g (1.20 mmols) of potassium fluoride, and 0.58 g (4.0 mmols) of octanethiol were placed and refluxed for reaction for about 24 hours. After the reaction, the reaction solution was filtered to remove potassium fluoride and then the organic layer was distilled to expel α-chloronaphthalene. The solids consequently obtained were dried to obtain 0.57 g of a crude product. Then, the crude product was refined by means of a column packed with silica gel (Wakogel C-200) to obtain 0.38 g of 6,7-bis(2,6-diisopropylanilino)-5-(octylthio)-

8-fluoroquinizarin [dye (232)] (yield 63.3 mol %). The physical properties of this dye and the analyses used for the identification of this compound are shown below.

Visible absorption spectrum (in chloroform):

λmax 664.0 nm (ε: 17000)

709.5 nm (ε: 21700)

Mass spectrum:

m/e=753 (M$^+$, 60)

m/e=607 (M$^+$–146, 70)

m/e=592 (M$^+$–161, 80)

Elementary analyses:

|  | C (%) | H (%) | N (%) | S (%) | F (%) |
|---|---|---|---|---|---|
| Theoretical value | 73.37 | 7.63 | 3.72 | 4.20 | 2.52 |
| Measured value | 73.30 | 7.70 | 3.77 | 4.15 | 2.53 |

Melting point:

254.3° C.

EXAMPLE 57

In a four-neck flask of 50 cc in inner volume, 1 g (3.22 mmols) of 6-(hydroxy)-5,7,8-trifluoroquinizarin and 20 ml of 2,6-diisopropyl aniline were placed and left reacting at 140° C. for about 3 hours. After the reaction, the reaction solution was thrown into a mixture consisting of about 200 cc of acetone with about 200 cc of water and then acidified with concentrated hydrochloric acid to induce separation of solids. The solids were separated by filtration, washed with water, and dried to obtain 1.6 g of a crude product. Then, this crude product was refined by means of a column packed with silica gel (Wakogel C2-00) to obtain 0.7 g of 6,8(or 5)-bis(2,6-diisopropylanilino)-7-hydroxy-5(or 8)-fluoroquinizarin [dye (231)] (yield 34.8 mol %). The physical properties of this dye and the analyses used for the identification of this compound are shown below.

Visible absorption spectrum (in ethyl cellosolve):

λmax 644.5 nm (ε: 33400)

595.5 nm

Mass spectrum:

m/e=624 (M$^+$, 100)

m/e=607 (M$^+$–17, 30)

Elementary analyses:

|  | C (%) | H (%) | N (%) | F (%) |
|---|---|---|---|---|
| Theoretical value | 73.04 | 6.62 | 4.49 | 3.04 |
| Measured value | 73.30 | 6.63 | 4.48 | 3.08 |

EXAMPLE 58

In a four-neck flask of 500 cc in inner volume, 3.0 g (9.61 mmols) of 5,6,7,8-tetrafluoroquinizarin, 3.75 g (19.2 mmols) of sodium sulfanilate and 350 ml of butanol were placed and refluxed for reaction for about 10 hours. After the reaction, the reaction solution was filtered to remove butanol, to obtain 4.78 g of a crude product. Then, this crude product was refined by means of a column packed with silica gel (Wakogel C2-00) to obtain 1.25 g of 6-(p-sodium sulfonate anilino)-5,7,8-trifluoroquinizarin [dye (27)] (yield 26.7 mol %). The physical properties of this dye and the analyses used for the identification of this compound are shown below.

Visible absorption spectrum (in methanol):

λmax 521.5 nm (ε: 10600)

Elementary analyses:

|  | C (%) | H (%) | N (%) | F (%) | S (%) | Ash (%) |
|---|---|---|---|---|---|---|
| Theoretical value | 49.28 | 1.85 | 2.88 | 11.70 | 6.57 | 4.72 |
| Measured value | 49.26 | 1.89 | 2.84 | 11.75 | 6.51 | 4.70 |

EXAMPLE 59

In a four-neck flask of 500 cc in inner volume, 0.7 g (1.54 mmols) of 6-(2,6-dichloroanilino)-5,7,8-trifluoroquinizarin, 3.0 g (31.9 mmols) of phenol, 350 ml of isopropyl alcohol, and 0.0863 g (1.54 mmols) of potassium hydroxide were placed and refluxed for reaction for about 3 hours. After the reaction, the reaction solution was distilled to expel isopropyl alcohol. The distillate was dissolved in toluene, transferred into a separation funnel, combined with an aqueous sodium hydroxide solution, and shaken to effect separation. Then, the organic layer was distilled to expel toluene. The solids consequently obtained were dried to obtain 0.772 g of 6-(2,6-dichloroanilino)-7-phenoxy-5,8-difluoroquinizarin [dye (110)] (yield 94.8 mol %). The physical properties of this dye and the analyses used for the identification of this compound are shown below.

Visible absorption spectrum (in chloroform):

λmax 521.0 nm (ε: 17900)

Mass spectrum:

m/e=529 (M$^+$, 80)

m/e=492 (M$^+$–37, 100)

Elementary analyses:

|  | C (%) | H (%) | N (%) | F (%) | Cl (%) |
|---|---|---|---|---|---|
| Theoretical value | 59.11 | 2.48 | 2.65 | 7.18 | 13.42 |
| Measured value | 59.07 | 2.49 | 2.66 | 7.15 | 13.45 |

Melting point:

182.9° C.

EXAMPLE 60

In a four-neck flask of 100 cc in inner volume, 70 g of 2,6-isopropyl aniline and 3 g (11.6 mmols) of 6-fluoroquinizarin were placed and left reacting at 230° C. for about 3 hours. After the reaction, the reaction solution was thrown into a mixture consisting of about 400 cc of acetone with about 500 cc of water and then acidified with concentrated hydrochloric acid to induce separation of solids. The solids were separated by filtration, washed with water, and dried to obtain 5.4 g of a crude product. Then, this crude product was refined by means of a column packed with silica gel (Wakogel C-200) to obtain 4.1 g of 6-(2,6-isopropylanilino) quinizarin [dye (99)] (yield 84.4 mol %). The physical properties of this dye and the analyses used for the identification of this compound are shown below.

Visible absorption spectrum (in toluene):

λmax 560 nm (ε: 14850)

Mass spectrum:

m/e=415 (M$^+$, 60)

m/e=400 (M$^+$-25, 100)

Elementary analyses:

|  | C (%) | H (%) | N (%) | O (%) |
|---|---|---|---|---|
| Theoretical value | 75.16 | 6.06 | 3.37 | 15.40 |
| Measured value | 75.07 | 6.10 | 3.31 | 15.51 |

Solubility

Not less than 3% by weight in toluene.

EXAMPLE 61

In a four-neck flask of 100 cc in inner volume, 70 g of dichloro aniline and 3 g (11.6 mmols) of 6-fluoroquinizarin were placed and left reacting at 250° C. for about 5 hours. After the reaction, the reaction solution was thrown into a mixture consisting of about 400 cc of acetone with about 500 cc of water and then acidified with concentrated hydrochloric acid to induce separation of solids. The solids were separated by filtration, washed with water, and dried to obtain 3.8 g of a crude product. Then, this crude product was refined by means of a column packed with silica gel (Wakogel C-200) to obtain 2.6 g of 6-(2,6-dichloroanilino) quinizarin [dye (102)] (yield 56.0 mol %). The physical properties of this dye and the analyses used for the identification of this compound are shown below.

Visible absorption spectrum (in toluene):

λmax 516 nm (ε: 15600)

Mass spectrum:

m/e=400 (M$^+$, 60)

m/e=399 (M$^+$, 70)

m/e=364 (M$^+$-36, 100)

Elementary analyses:

|  | C (%) | H (%) | N (%) | Cl (%) |
|---|---|---|---|---|
| Theoretical value | 60.02 | 2.77 | 3.50 | 17.72 |
| Measured value | 60.15 | 2.71 | 3.45 | 17.97 |

Solubility

Not less than 3% by weight in toluene.

EXAMPLE 62

In a four-neck flask of 50 cc in inner volume, 5 g (16.1 mmols) of 5,6,7,8-tetrafluoroquinizarin and 25 ml of 2,6-diisopropyl aniline were placed and left reacting at 180° C. for about 24 hours. After the reaction, the reaction solution was thrown into a mixture consisting of about 200 cc of acetone with about 200 cc of water and then acidified with concentrated hydrochloric acid to induce separation of solids. The solids were separated by filtration, washed with water, and dried to obtain 6.5 g of a crude product. Then, this crude product was refined by means of a column packed with silica gel (Wakogel C-200) to obtain 1.04 g of 5,6,7-tris(2,6-diisopropylanilino)-8-fluoroquinizarin [dye (245)] (yield 8.1 mol %). The physical properties of this dye and the analyses used for the identification of this compound are shown below.

Visible absorption spectrum (in ethyl cellosolve):

λmax 698.5 nm (ε: 29200)

643.0 nm

Mass spectrum:

m/e=622 (M$^+$, -162 100)

m/e=606 (M$^+$, -178 30)

Elementary analyses:

|  | C (%) | H (%) | N (%) | F (%) |
|---|---|---|---|---|
| Theoretical value | 76.59 | 7.46 | 5.36 | 2.42 |
| Measured value | 76.61 | 7.42 | 5.31 | 2.48 |

EXAMPLE 63

Four (4) parts of 6-anilino-7-butylamino-5(or 8)-octyloxy-8(or 5)-fluoroquinizarin [dye (193)] and 97 parts of a styrene-acrylic ester copolymer (produced by Sanyo Chemical Industries Co., Ltd. and marketed under trademark designation of "Himer TB1000F") were fused and kneaded with hot rolls at a temperature of about 150° C. The resultant molten mixture was cooled, coarsely pulverized with a hammer mill, and then finely pulverized with an air jet type fine pulverizer. The fine powder consequently obtained was classified to separate a part having particle diameters in the range of 3 to 20 μm. The separated part of the powder was used as a toner.

Four parts of this toner and 100 parts of a carrier (produced by coating a ferrite powder having particle diameters in the range of 50 to 150 μm with a silicone resin) were uniformly mixed to prepare a developer. When a given image was copied in a xerographic copying device (produced by Ricoh Company Limited and marketed under product code of "FT-4060") using this developer, clear cyan images perfectly free from fogging were obtained. The copied images were tested for lightfastness with a xenon lamp lightfastness tester (produced by Heraeus Corp. and marketed under trademark designation of "SUNTEST CPS") (black panel temperature 63° C.) and subjected to measurement of color density with a densitometer (produced by McBeth Corp. of U.S. and marketed under product code of "RD-914") to rate ratio of retention of color density after 100 hours' standing. The images showed a ratio of retention of not less than 92%, based on the initial color density taken as 100%. The results indicate that the developer possessed ideal lightfastness.

EXAMPLES 64 TO 75

Toners were prepared by following the procedure of Example 63 while using the dye shown in Table 10 instead and were tested for lightfastness by the same copying test. In the test, clear cyan images free from fogging were obtained similarly to those obtained in Example 63. The copied images were tested for lightfastness. The results are shown in Table 10. They indicate that all the copied images showed ratios of retention of color density invariably exceeding 90%.

EXAMPLES 76 TO 88

Toners were prepared by following the procedure of Example 63 while using the dye shown in Table 10 instead and were tested for lightfastness by the same copying test. In the test, clear magenta images free from fogging were obtained similarly to those obtained in Example 63. The copied images were tested for lightfastness. The results are shown in Table 10. They indicate that all the copied images showed ratios of retention of color density invariably exceeding 90%.

TABLE 10

| Example | Dye No. | Ratio of reteinsion of color density (%) | Color tone |
|---|---|---|---|
| 63 | (193) | 92 | Cyan |
| 64 | (197) | 91 | Cyan |
| 65 | (196) | 92 | Cyan |
| 66 | (156) | 95 | Cyan |
| 67 | (157) | 96 | Cyan |
| 68 | (137) | 95 | Cyan |
| 69 | (139) | 94 | Cyan |
| 70 | (158) | 92 | Cyan |
| 71 | (159) | 93 | Cyan |
| 72 | (160) | 94 | Cyan |
| 73 | (161) | 95 | Cyan |
| 74 | (162) | 93 | Cyan |
| 75 | (163) | 92 | Cyan |
| 76 | (33) | 91 | Magenta |
| 77 | (36) | 92 | Magenta |
| 78 | (41) | 95 | Magenta |
| 79 | (45) | 94 | Magenta |
| 80 | (51) | 90 | Magenta |
| 81 | (65) | 93 | Magenta |
| 82 | (69) | 94 | Magenta |
| 83 | (68) | 95 | Magenta |
| 84 | (72) | 93 | Magenta |
| 85 | (75) | 94 | Magenta |
| 86 | (70) | 91 | Magenta |
| 87 | (22) | 94 | Magenta |
| 88 | (102) | 92 | Magenta |

EXAMPLE 89

(1) Method for preparation of ink composition

Cyan dye (193) 3 parts

Polyvinyl butyral resin (produced by Sekisui Chemical Co., Ltd. and marketed 4 parts under product code of "BLS-S")

Methylethyl ketone 47 parts

Toluene 47 parts

An ink composition was prepared by forming a dye blend composed of the components shown above and subjecting the dye blend and glass beads to a mixing treatment by the use of a paint shaker for about 30 minutes.

(2) Method for manufacture of transfer sheet

The ink was applied in such an amount as to form a dry layer about 1 $\mu$m in thickness to the rear face of a polyethylene terephthalate film (produced by Unitika Ltd. and marketed under trademark designation of "EMBLET") having a thickness of 5.7 $\mu$m and having undergone a heat-proofing treatment with a silicone graft copolymer (about 1 $\mu$m) (produced by Nippon Shokubai Co., Ltd.) and the applied layer of the ink was dried.

(3) Material to which images were transferred

Print papers for Mitsubishi video print pack (produced by Mitsubishi Electric Corp. and marketed under product code of "CK-10P") were used as materials to which images were to be transferred.

(4) Transfer recording

Transfer recording was effected by superposing the inked surface of a transfer sheet on the dye-receiving surface of the print paper mentioned above and operating a thermal head on the rear surface side of the transfer sheet under the conditions of 10 V of voltage applied to the head and 4.0 m.sec. of printing time. The results were as shown in Table 11. The color density was measured by the use of a densitometer (produced by McBeth Corp. of U.S. and marketed under product code of "RD-914").

(5) Lightfastness

The recorded images were tested for lightfastness by the use of a xenon lamp lightfastness tester (produced by Heraeus Corp. and marketed under trademark designation of "SUNTEST CPS") (black panel temperature 63° C.). The results of the test were rated by the ratio of retention of color density after 100 hours' standing. The results were as shown in Table 11.

(6) Stability in storage

The recorded images obtained as described above were left standing in an atmosphere kept at 50° C. for 50 hours and, after the standing, were examined to determine the presence or absence of change caused on the images owing to the standing. The results were as shown in Table 11. The images were found to have retained their clearness intact. When a white paper was rubbed against the images, it was not stained with the ink. This fact indicates that the ink excelled in stability in storage.

EXAMPLES 90 TO 100

Ink compositions were prepared, transfer sheets produced, and transfer recording carried out by following the procedure of Example 89 while using the dye shown in Table 11 instead. The results were as shown in Table 11. The recorded images were tested for lightfastness and then for stability in storage in the same manner as in Example 89. The results were as shown in Table 11.

TABLE 11

| Example | Dye No. | Color development strength | Color tone | Light-fastness | Stability in stroage |
|---|---|---|---|---|---|
| 89 | (193) | 2.48 | Cyan | ○ | Good |
| 90 | (197) | 2.43 | Cyan | ○ | Good |
| 91 | (196) | 2.33 | Cyan | ⊙ | Good |
| 92 | (156) | 2.28 | Cyan | ⊙ | Good |
| 93 | (137) | 2.39 | Cyan | ⊙ | Good |
| 94 | (139) | 2.42 | Cyan | ○ | Good |
| 95 | (141) | 2.35 | Cyan | ⊙ | Good |
| 96 | (158) | 2.43 | Cyan | ○ | Good |
| 97 | (159) | 2.36 | Cyan | ○~Δ | Good |
| 98 | (183) | 2.14 | Cyan | ⊙ | Good |
| 99 | (160) | 2.34 | Cyan | ○ | Good |
| 100 | (162) | 2.37 | Cyan | ○ | Good |

Lightfastness
⊙: Ratio of retension of color density is not less than 80%.
○: Ratio of retension of color density is not less than 70%.
○~Δ: Ratio of retension of color density is not less than 60%.

EXAMPLES 101 TO 113

Ink compositions were prepared, transfer sheets produced, and transfer recording carried out by following procedure of Example 89 while using the dyes shown in Table 12 instead. The results were as shown in Table 12. The recorded images were tested for lightfastness and then stability in storage in the same manner as in Example 89. The results were as shown in Table 12.

TABLE 12

| Example | Dye No. | Color development strength | Color tone | Light-fastness | Stability in stroage |
|---|---|---|---|---|---|
| 101 | (33) | 2.42 | Magenta | ○ | Good |
| 102 | (36) | 2.39 | Magenta | ○ | Good |
| 103 | (41) | 2.61 | Magenta | ○ | Good |
| 104 | (45) | 2.54 | Magenta | ⊙ | Good |
| 105 | (51) | 2.58 | Magenta | ⊙ | Good |
| 106 | (65) | 2.52 | Magenta | ○~Δ | Good |
| 107 | (69) | 2.63 | Magenta | ○ | Good |

TABLE 12-continued

| Example | Dye No. | Color development strength | Color tone | Light-fastness | Stability in stroage |
|---|---|---|---|---|---|
| 108 | (68) | 2.23 | Magenta | ⊚ | Good |
| 109 | (72) | 2.39 | Magenta | ⊚ | Good |
| 110 | (75) | 2.44 | Magenta | ⊚ | Good |
| 111 | (70) | 2.33 | Magenta | ○ | Good |
| 112 | (22) | 2.25 | Magenta | ⊚ | Good |
| 113 | (102) | 2.12 | Magenta | ⊚ | Good |

Lightfastness
⊚: Ratio of retension of color density is not less than 80%.
○: Ratio of retension of color density is not less than 70%.
○~Δ: Ratio of retension of color density is not less than 60%.

EXAMPLE 114

On a substrate of polycarbonate resin measuring 1.2 mm in thickness, 120 mm in outside diameter, and 15 mm in inside diameter and containing a spiral guide groove 80 nm in depth and 1.6 μm in pitch, a coating solution prepared by dissolving the compound (245) mentioned above at a concentration of 6% in methyl cellosolve was deposited in the form of a film of 120 nm in thickness by the use of a spin coater. Then, on the applied film of the coating solution, gold was vacuum deposited in a thickness of 70 nm. Further, a protective film of an ultraviolet light curing resin was superposed on the coat of gold to complete an optical recording medium. The optical recording medium thus obtained was tested for reflectance in the wavelength zone of 770 nm to 800 nm. It was found to have a reflectance of 71%. This fact indicates that the optical recording medium possessed stable optical characteristics.

On this optical recording medium, an EMF signal was recorded successfully with a semiconductor laser of a wavelength of 780 nm at an output of 6.5 mW and a linear velocity of 1.4 m/s. The analysis of the signal thus obtained revealed that the level of this signal sufficed for effective regeneration with a commercially available CD player.

EXAMPLES 115 TO 122

Optical recording media were obtained by following the procedure of Example 114 while using the compound (232), the compound (233), the compound (234), the compound (239), the compound (240), and the compound (241) in place of the compound (245) and they were tested for reflectance in the same manner as in Example 114. The reflectances they showed were invariably not less than 70%, indicating that they possessed stable optical characteristics.

On these optical recording media, an EMF signal was recorded successfully with a semiconductor laser of a wavelength of 780 nm at an output of 6.5 mW and a linear velocity of 1.3 m/s. The analysis of the signals thus recorded revealed that their levels sufficed for effective recording with a commercially available CD player.

EXAMPLES 123 TO 128

(1) Preparation of recording ink

Recording inks were prepared by thoroughly mixing and dissolving the components of varying compositions shown below in Table 13 and cooling the resultant blends.

(2) Recording

In a commercially available solid ink grade ink jet printer which was partly modified for the sake of use herein, ink jet recording was carried out using the recording ink produced as described above. The recorded images consequently obtained were invariably very clear, rich in contrast, and satisfactory in color tone. They were tested for lightfastness by the following method.

(3) Evaluation of lightfastness

The recorded images were tested for lightfastness by the use of a xenon lightfastness tester (produced by Heraeus Corp. and marketed under trademark designation of "SUNTEST CPS") (black panel temperature 63° C.) and subjected to measurement of color density by the use of a densitometer (produced by McBeth Corp. of U.S. and marketed under product code of "RD-914"). The results of the measurement were rated by the ratio of retention of color density after 100 hours' standing. The ratios of retention of color density were invariably not less than 90%, based on the initial density taken as 100%. This fact indicates that the recording inks excelled in lightfastness.

The results were as shown in Table 13.

TABLE 13

| | Example | | | | | |
|---|---|---|---|---|---|---|
| | 123 | 124 | 125 | 126 | 127 | 128 |
| Oleic acid | | | 25 | | | 25 |
| Benzyl ether | | | 60 | | | 60 |
| Japan wax | | 98 | | | 98 | |
| Acrylate - type synthetic wax (Produced by Nippon Shokubai Co., Ltd. and marketed under product code "CX-ST100") | 98 | | 13 | 98 | | 13 |
| Dye (22) | 2 | 2 | 2 | | | |
| Dye (139) | | | | 2 | 2 | 2 |
| Lightfastness | 95% | 93% | 92% | 93% | 92% | 94% |

EXAMPLE 129

A color filter was produced by preparing a solution of 97 parts of polymethyl methacrylate and 3 parts of the dye (22) in 300 parts of chloroform, casting the solution on a glass substrate, and drying the cast layer of the solution.

The color filter produced as described above had a clear magenta color tone showing no sign of turbidity and diffusing a sensation of transparency. When it was tested for lightfastness by the use of a xenon lamp lightfastness tester (produced by Heraeus Corp. and marketed under trademark designation of "SUNTEST CPS") (black panel temperature 63° C.), it showed absolutely no sign of change in color tone. This fact indicates that this color filter possessed ideal lightfastness.

EXAMPLE 130

A color filter was produced by faithfully following the procedure of Example 129 excepting the dye (139) was used in place of the dye (22).

The color filter produced as described above had a clear cyanogen color tone showing no sign of turbidity and diffusing a sensation of transparency. When it was tested for lightfastness by the use of a xenon lamp lightfastness tester (produced by Heraeus Corp. and marketed under trademark designation of "SUNTEST CPS") (black panel temperature 63° C.), it showed absolutely no sign of change in color tone. This fact indicates that this color filter possessed ideal lightfastness.

As described above, the novel compound of this invention is enabled to effect control of an absorption wavelength properly for an intended application within an absorption wavelength in the range of 480 nm to 850 nm and acquire outstanding solubility in organic solvents by introducing mainly secondary amino groups into one to four of the 5, 6, 7, and 8 positions and to at least either the 6 or 7 position of the quinizarin structure. Further, since the lightfastness inherently possessed by the quinizarin structure can be maintained owing to the substituents at specific positions as compared with the conventional quinizarin type dyes, this novel compound can be used as a visible absorption dye or a near infrared absorption dye in the field in which the dyes of the conventional development have proved to be impracticable.

The toner of this invention is characterized by its high transparency and, therefore, produces color images which excel in repeatability of color and exhibit an ideal color tone and manifest prominent lightfastness. Even in continuous copying, it produces stable images at all times.

Further, the quinizarin type dye to be used in the construction of a cyan and/or magenta type thermal-transfer sheet according to this invention exhibits highly satisfactory solubility in the solvents and binder resins of the type intended for dyes, manifests an excellent color tone of the cyan and/or magenta color and, have excellent properties useful for magenta color or cyan color when used in a thermal-transferdye.

Since the novel quinizarin compound of this invention excels in absorption characteristics, solubility, lightfastness, reflectance, sensitivity, and economy, it can manifest an outstanding effect when it is used in a tracing type optical recording medium which shows interchangeability and convertibility among the players of CD, PHOTO-CD, and CD-ROM, i.e. devices which are in need of such characteristics as mentioned above.

Further, the use of the novel quinizarin compound of this invention permits production of a color filter which excels in lightfastness, avoids inducing turbidity, diffuses a sensation of transparency, and enjoys prominence of color tone. The use of the quinizarin compound of this invention also allows production of prints with excellent contrast and production of an ink jet grade ink composition capable of producing recorded images excellent in lightfastness and color tone as well.

What is claimed is:

1. A quinizarin compound which has a quinizarin structure represented by a following formula (1)

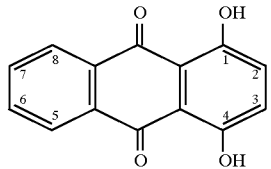

(1)

wherein one to three of the 5, 6, 7, and 8 positions and at least either the 6 or 7 position of the quinizarin structure are formed of secondary amino groups and the remaining positions thereof are formed of at least one member selected from the class consisting of hydrogen atom, halogen atoms, alkoxy groups, substituted and unsubstituted phenoxy groups, alkylthio groups, and substituted and unsubstituted phenylthio groups.

2. A magenta dye comprising the quinizarin compound of claim 1 containing one secondary amino group.

3. A cyan dye comprising the quinizarin compound of claim 1 containing two secondary amino groups.

4. An electrophotographic grade color toner composition comprising at least one coloring agent selected from the group consisting of the magenta dye comprising a quinizarin compound of claim 1 containing one secondary amino group and the cyan dye comprising the quinizarin compound of claim 2 containing two secondary amino groups.

5. A thermal-transfer recording sheet characterized by possessing a coloring material layer containing at least one dye selected from the group consisting of the magenta dye comprising a quinizarin compound of claim 1 containing one secondary amino group and the cyan dye comprising the quinizarin compound of claim 2 containing two secondary amino groups on a substrate.

6. An optical recording medium having the quinizarin compound of claim 1 contained in a recording layer formed on a substrate.

7. An ink jet grade ink composition comprising at least one dye selected from the group consisting of the magenta dye comprising a quinizarin compound of claim 1 containing one secondary amino group and the cyan dye comprising the quinizarin compound of claim 1 containing two secondary amino groups and a vehicle.

8. An ink jet grade ink composition according to claim 7, wherein said vehicle contains wax.

9. A color filter containing the quinizarin compound of claim 1 in a filter substrate.

10. A color filter containing at least one dye selected from the group consisting of the magenta dye comprising a quinizarin compound of claim 1 containing one secondary amino group and the cyan dye comprising the quinizarin compound of claim 1 containing two secondary amino groups in a filter substrate.

11. A method for the production of the quinizarin compound of claim 1, which comprises causing a quinizarin compound which has a quinizarin structure having one to four of the 5, 6, 7, and 8 positions and at least either the 6 or 7 position formed of a halogen atom to react with at least one member selected from the class consisting of primary amine compounds, aliphatic mercapto compounds, unsubstituted and substituted phenylthiols, ammonia, water, aliphatic hydroxy compounds, unsubstituted and substituted phenols.

12. A method for the production of the quinizarin compound set forth in claim 1, characterized by causing a phthalic anhydride derivative which has a phthalic anhydride structure having one to four of the 3, 4, 5, and 6 positions and at least either the 4 or 5 position formed of at least one member selected from the class consisting of secondary amino groups, alkylthio groups, and optionally substituted phenylthio groups and having the remaining positions formed of at least one member selected from the class consisting of hydrogen atom, halogen atoms, amino group, hydroxy group, alkoxy groups, and optionally substituted phenoxy groups to react with hydroquinone or 1,4-dimethoxybenzene.

* * * * *